United States Patent
Shao

(10) Patent No.: US 10,798,174 B2
(45) Date of Patent: *Oct. 6, 2020

(54) SMART CITY SYSTEM ARCHITECTURE

(71) Applicant: CHENGDU QINCHUAN IOT TECHNOLOGY CO., LTD., Chengdu (CN)

(72) Inventor: Zehua Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/320,496

(22) PCT Filed: Nov. 14, 2016

(86) PCT No.: PCT/CN2016/105670
§ 371 (c)(1),
(2) Date: Mar. 21, 2019

(87) PCT Pub. No.: WO2018/028070
PCT Pub. Date: Feb. 15, 2018

(65) Prior Publication Data
US 2019/0273783 A1    Sep. 5, 2019

(30) Foreign Application Priority Data
Aug. 10, 2016  (CN) .......................... 2016 1 0650337

(51) Int. Cl.
*H04L 29/08* (2006.01)
*G06Q 50/26* (2012.01)
*G06Q 50/06* (2012.01)

(52) U.S. Cl.
CPC ............. *H04L 67/12* (2013.01); *G06Q 50/06* (2013.01); *G06Q 50/26* (2013.01)

(58) Field of Classification Search
CPC .......... H04L 67/12; G06Q 50/06; G06Q 50/26
See application file for complete search history.

(56) References Cited

U.S. PATENT DOCUMENTS

| | | | |
|---|---|---|---|
| 2012/0108163 A1* | 5/2012 | Bai | ...................... H04L 12/1854 455/3.06 |
| 2015/0026044 A1* | 1/2015 | Refaeli | .................. G01D 21/00 705/39 |
| 2015/0206264 A1* | 7/2015 | Carrato | .................. G06Q 50/26 705/348 |

FOREIGN PATENT DOCUMENTS

| | | |
|---|---|---|
| CN | 105654699 A | 6/2016 |
| CN | 105654700 A | 6/2016 |

(Continued)

OTHER PUBLICATIONS

Gongzhong Zhang and Weijun Guo. "Talking about the architecture of smart city". Intelligent Buildings. 162: 62-65. Feb. 2014.

(Continued)

*Primary Examiner* — Wing F Chan
*Assistant Examiner* — Billy H Ng
(74) *Attorney, Agent, or Firm* — Bayramoglu Law Offices LLC

(57) ABSTRACT

A smart city system, including: a functional system, a physical system, and an information system. The functional system is an expression form of functions of the smart city; the information system is an implementation way of the functions of the smart city; and the physical system is a physical support carrier for the implementation of the functions of the smart city. The functional system has a five-platform structure; the physical system has a five-layer structure; and the information system has a five-domain structure. Through the setting of these technical characteristics, a smart city system with clear system, definite functions, matching hardware, and clear information circulation (Continued)

can be constructed. The smart city system has a wide range of applications.

20 Claims, 6 Drawing Sheets

(56) References Cited

FOREIGN PATENT DOCUMENTS

| | | | |
|---|---|---|---|
| CN | 105678647 A | 6/2016 |
| CN | 105678648 A | 6/2016 |
| CN | 105678649 A | 6/2016 |
| CN | 105678650 A | 6/2016 |
| CN | 105678997 A | 6/2016 |
| CN | 105743751 A | 7/2016 |

OTHER PUBLICATIONS

Ye Su and Shigang Feng. "Research on Hierarchical Architecture of Smart City Standard System". China Management Informationization. 17(7): 93-97. 2014.

* cited by examiner

US 10,798,174 B2

SMART CITY SYSTEM ARCHITECTURE

CROSS REFERENCE TO THE RELATED APPLICATIONS

This application is the national phase entry of International Application No. PCT/CN2016/105670, filed on Nov. 14, 2016, which is based upon and claims priority to Chinese Patent Application No. 201610650337.6, filed on Aug. 10, 2016, the entire contents of which are incorporated herein by reference.

TECHNICAL FIELD

The present invention relates to a smart city system architecture, and specifically, the present invention mainly relates to a smart city system architecture composed of an Internet of Things (IoT) system.

BACKGROUND

With the rapid development of Internet technology, it brings the tide of the global informatization, and the requirements and demands for the intellectualization of human world are becoming higher and higher. Since the "smart earth" development strategy was first proposed by IBM company in 2008, developed countries around the world have gradually realized that smart cities are an inevitable trend in the development of human society, and started to vigorously and actively carry out the construction of smart cities. On the basis of the construction of digital cities, some developed regions in China have begun to explore the construction of smart cities. Beijing, Shanghai, Nanjing and other regions have already listed smart cities as a key research topic. At present, the construction and development of smart cities at home and abroad are limited to the categories of information cities and intelligent cities. The deeper understanding of smart city is still lacking, and there is still no clear conclusion about the system architecture of smart city. The construction focus and research focus of smart city are currently focused on the aspects of services and applications, and there is no complete smart city system architecture. The existing smart city system architecture, with its unclear, ambiguous and unsystematic relationship among functions, physics and information, cannot correctly guide the construction of smart city. Therefore, the smart city system architecture needs to be further studied.

SUMMARY

One of the objectives of the present invention is to provide a smart city system architecture in view of the above-mentioned deficiencies, so as to solve the problem that the smart city system architecture in the prior art does not have a complete system architecture, and simultaneously solve the problem of unclear relationship among functions, information and physics of the smart city system architecture in the prior art. The present invention will be illustrated and explained in detail mainly through two aspects: what functions should be realized by the smart city system architecture, and how the smart city realizes these functions through a clear relationship among functions, information and physics.

The present invention is implemented as follows.

A smart city system architecture includes at least one smart city sub-system.

The smart city system architecture includes a functional system, a physical system, and an information system.

The functional system is a form of function expression; the information system is a way of function implementation; and the physical system is a carrier providing a physical support for the function implementation.

The functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of each platform in the functional system is implemented through the supports of physical entities in the corresponding physical system and the operation of information in the corresponding information system.

The object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

In the present invention, the function of the object platform is to implement the sensing and control. A sensor device senses sensory information and realizes the sensing function; through the sensor network platform, the management platform and the service platform, the sensory information is transmitted to a user through the operation of the smart city system architecture; the user converts the sensory information to control information; the control information is transmitted to a control device of the object platform via the service platform, the management platform, and the sensor network platform; and the control is performed by the control device, thereby forming a closed-loop information structure. The closed-loop information structure ensures the effectiveness of sensing and control in the smart city system architecture.

The function of the sensor network platform of the present invention is to implement the mutual communication between the object platform and the management platform. The communication module of the sensor device sends the sensory information obtained by the sensor device to an IoT intelligent gateway, and the IoT intelligent gateway transmits the sensory information to an operator communication server through the public network, thereby completing the communication of the sensory information in the sensor network platform. The operator communication server sends the control information to the IoT intelligent gateway through the public network, and the IoT intelligent gateway sends the control information to the communication module of the control device, thereby completing the communication of the control information in the sensor network platform. In the process of information transmission, the security of information should be guaranteed. Security refers to the security of all links in the process of information operation, including the security of the information, the security of the information operation process, and the security of the information exchange nodes.

The management platform of the present invention processes, stores, classifies, identifies and analyzes the information in the smart city system architecture, thereby achieving the management functions, and providing a support for the service system. The management platform is an integrated management platform of the whole smart city system architecture.

The management platform corresponds to the management domain in the information structure; and the management domain includes a sensory information management system and a control information management system. The management platform corresponds to an operator management server and various facilities connected to the server in the physical structure. The management platform is the carrier of the sensory information management system and the control information management system in the information structure.

The service platform of the present invention is a platform to provide services for users and realizes service functions, including an operator service platform, a public government service platform, and a public social network service platform.

The service items of the service platform include operator services and public services. The operator services are mainly provided by the operator service platform; and the public services are mainly provided by the public government service platform and the public social network service platform.

The smart city service platform corresponds to the service domain in the information structure, and corresponds to three parts of content in the physical structure, the first is an operator service platform server, the second is a government server, and the third is a public social network server.

The function of the user platform of the present invention is a platform for users to enjoy the services of the smart city system architecture. The users use various user terminals to realize the output of their own needs and enjoy the services of the whole smart city system architecture through human-computer interaction. The user platform is a direct user-oriented platform in the smart city system architecture. The user sends out control information through the user platform; and through the operation of information in the smart city system architecture, the control information is finally transmitted to the object platform to realize the control of the object and meet the user's needs.

Another important component of the smart city system architecture of the present invention is the physical system. The physical system includes an object layer, a sensor network layer, a management layer, a service layer, and a user layer. In the smart city system architecture, a complete smart city physical system architecture is mainly formed through the architecture of each physical layer and the interconnection relationship between the physical layers, thus supporting the complete operation of information in the smart city and finally realizing the functions of the smart city.

The object layer is a layer where carrying entities carrying all object information in the smart city are located, and is the basis of the physical system of the smart city. The object layer refers to the sensor unit of the sensor device and the control unit of the control device, possessing a sensing function and a control function. The sensor device and the control device may be a single device that performs sensing and control together, or may be two different devices that respectively perform sensing and control.

The sensor network layer includes a communication module of the sensor device and a communication module of the control device, an IoT intelligent gateway, a public network, and an operator communication server. Through a sensor network composed of the communication module of the sensor device, the communication module of the control device, the IoT intelligent gateway, the public network and the operator communication server, the mutual communication between the sensor network layer and the operator management server can be realized.

The core of the management layer is the server, including the operator management server and other related facilities.

The service layer includes the operator service platform server, the government server, and the public social network server.

The user layer is a facility that provides physical support for the functions of the user platform, mainly including various terminal facilities, such as mobile communication terminals, special purpose terminals, Internet terminals, or wireless local area network terminals. Users can complete the reception and transmission of information mainly through these terminal facilities.

Another important component of the smart city system architecture of the present invention is the information system. The function of the information system is to realize the operation of information in the smart city system architecture; without the operation of information, any function of the smart city system architecture cannot be realized.

The lowest layer of the information system is the object domain. The information in the object domain includes the sensory information and the control information; the sensory information is derived from an information source, and the control information is issued after passing through the smart city system architecture.

The sensing domain in the information system is a collection of various communication information in the smart city, including sensory communication information and control communication information. The sensory communication information is information for communicating the sensory information uploaded by the object domain, and the sensory communication information is provided by a sensory information communication system; and the control communication information is information for communicating the control information issued after passing through the smart city system architecture, and the control communication information is provided by a control information communication system.

The management domain in the information system is a collection of various management information in the smart city, including sensory management information and control management information. The sensory management information is provided by a sensory information management system; and the control management information is provided by a control information management system. The management domain is an information guarantee for the orderly operation of the smart city.

The service domain in the information system is a collection of various service information in the smart city, including sensory service information and control service information. The sensory service information is provided by a public social sensory service system, a government sensory service system, and an operator sensory service system; and the control service information is provided by an operator control service system.

The user domain in the information system includes a variety of relevant user information.

Since the smart city is a very complex system, including many smart city sub-systems at different levels, as well as to facilitate the realization of functions of the smart city and understanding, it is also necessary to explain the smart city sub-systems based on the explanation of the architecture of smart city system.

The smart city sub-systems can be divided into different levels. The previous level smart city sub-system includes at least one next level smart city sub-system and/or at least one IoT system; and the lowest level smart city sub-system includes at least one IoT system. In other words, the smart city sub-system is ultimately composed of the IoT system.

There are juxtaposition, intersection and inclusion forms among smart city sub-systems. At the same level, smart city sub-systems are in a juxtaposition or intersection relationship; and at different levels, smart city sub-systems are in a juxtaposition or intersection or inclusion relationship. The intersection or inclusion relationship is finally reflected in the information sharing among smart city sub-systems.

The smart city sub-system and the IoT system also include a functional system, a physical system, and an information system, respectively.

The functional system is an expression form of functions of the smart city sub-system or the IoT system; the information system is an implementation way of the functions of the smart city sub-system or the IoT system; and the physical system is a physical support carrier for the implementation of the functions of the smart city sub-system or the IoT system.

The functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of each platform in the functional system is implemented through the supports of physical entities in the corresponding physical system and the operation of information in the corresponding information system.

The object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

In the smart city system architecture, the smart city system architecture possesses openness. The object platform, sensor network platform, management platform, service platform and user platform in the functional system include a plurality of object sub-platforms, a plurality of sensor network sub-platforms, a plurality of management sub-platforms, a plurality of service sub-platforms and a plurality of user sub-platforms, respectively.

The plurality of object sub-platforms jointly form the object platform of the smart city, and jointly exhibit the comprehensive sensing and control functions of the smart city. The object sub-platforms are divided into different levels of object sub-platforms. The previous level object sub-platform includes at least one next level object sub-platform and/or at least one object platform of a single IoT system; and the lowest level object sub-platform includes at least one object platform of a single IoT system.

There are juxtaposition, intersection and inclusion forms among various sub-platforms in the functional system of the smart city. At the same level, sub-platforms are in a juxtaposition relationship; and at different levels, sub-systems are in a juxtaposition or intersection or inclusion relationship. The intersection or inclusion relationship is finally reflected in the information sharing among sub-systems.

The plurality of sensor network sub-platforms jointly form the sensor network platform of the smart city to realize communications of sensory information and control information between the object platform and the management platform in the smart city system architecture. The sensor network sub-platforms are divided into different levels of sensor network sub-platforms. The previous level sensor network sub-platform includes at least one next level sensor network sub-platform and/or at least one sensor network platform of a single IoT system; and the lowest level sensor network sub-platform is composed of at least one sensor network platform of a single IoT system.

The plurality of management sub-platforms together form the management platform of the smart city to realize integrated urban management in smart city system architecture. The management sub-platforms are divided into different levels of management sub-platforms. The previous level management sub-platform includes at least one next level management sub-platform and/or at least one management platform of a single IoT system; and the lowest level management sub-platform is composed of at least one management platform of a single IoT system.

The plurality of service sub-platforms together form the smart city service platform to realize the service function of the smart city. The service sub-platforms are divided into different levels of service sub-platforms. The previous level service sub-platform includes at least one next level service sub-platform and/or at least one service platform of a single IoT system; and the lowest level service sub-platform is composed of at least one service platform of a single IoT system.

The plurality of user sub-platforms together form the user platform of the smart city to realize the function of the smart city to provide services to users. The user sub-platforms are divided into different levels of user sub-platforms. The previous level user sub-platform includes at least one next level user sub-platform and/or at least one user platform of a single IoT system; and the lowest level user sub-platform is composed of at least one user platform of a single IoT system.

In the functional system of the smart city of the present invention, the object platform at the lowest level is the starting point of the functional system architecture, supporting the entire functional system architecture. The sensor network platform is the bridge connecting the object platform and the management platform in the functional system architecture. The management platform is the center of the entire functional system, determining the realization of functions of the smart city. Above the management platform is the service platform, and the service platform realizes the information sharing and exchange among the sub-systems of the smart city while ensuring the privacy of the smart city sub-systems. Above the service platform is the user platform, and the user platform provides a guarantee for users in the smart city to realize human-computer interaction. The normal operation of the functional system of the smart city is completed under the organic combination and close cooperation of the five platforms, namely, the object platform, the sensor network platform, the management platform, the service platform and the user platform. At the same time, the smart city system architecture is a complex social system architecture, and the most basic component of the smart city system architecture is the IoT system architecture. The IoT system architecture is the most basic composition unit of smart city. The realization of the functions of the smart city is finally completed through the joint action and the organic combination of numerous most basic IoT system architectures.

Compared with the prior art, one of the beneficial effects of the present invention is as follows. The smart city system architecture is divided in detail, and the smart city system architecture is described exactly with what functions the smart city should achieve and how to achieve these functions in terms of the three dimensions of functional system, physical system and information system. Through the setting of these technical characteristics, a smart city system architecture with clear system, definite functions, matching hardware, and clear information circulation can be constructed, thereby providing basic model guarantee for the final realization of the smart city; and the smart city system architecture has a wide range of applications.

Moreover, the smart city system architecture of the present invention can realize the effectiveness, security, privacy, and openness of the information. In the smart city system architecture, a complete closed-loop is formed through the operation of information, thereby ensuring the complete operation of the sensory information and control information, and reflecting the effectiveness of the operation of the sensory information and control information. Security refers to the security of all links in the process of information operation, including the security of the information, the security of the information operation process, and the security of the information exchange nodes. In the whole smart city system architecture, the source of the sensory information in the object platform, the issue of the control information in the user platform, the information, and the operation of information between different platforms can ensure the security of information. The privacy of information refers to the realization of private communication between operators and users through the establishment of private channels in the service platform, so as to ensure the privacy of information. In addition, in the smart city system architecture, the smart city sub-system or the IoT system exchanges and shares information with the public government service platform and the public social network service platform, and therefore the information possesses openness.

DETAILED DESCRIPTION OF THE EMBODIMENTS

The present invention will be further described below with reference to the drawings.

Figure 1:
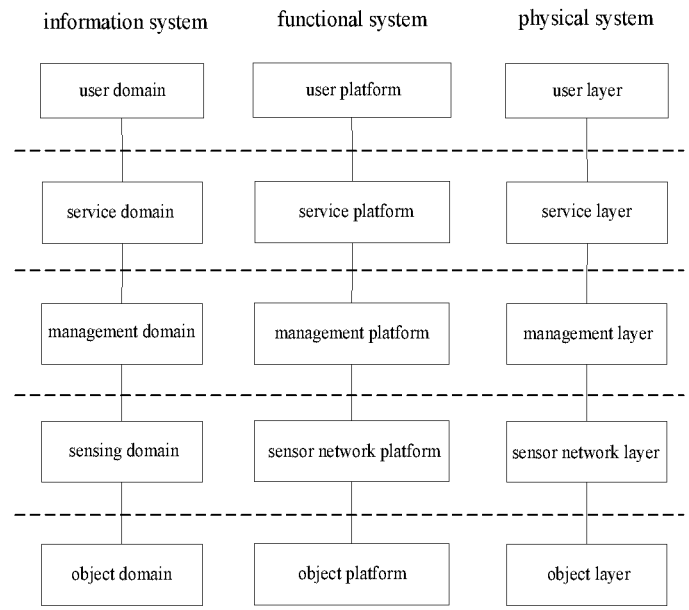
FIG. 1 is a schematic diagram of a smart city system architecture.

As shown in FIG. 1, a smart city system architecture includes at least one smart city sub-system.

The smart city system architecture includes a functional system, a physical system, and an information system.

The functional system is a form of function expression; the information system is a way of function implementation; and the physical system is a carrier providing a physical support for the function implementation.

The functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of each platform in the functional system is implemented through the supports of physical entities in the corresponding physical system and the operation of information in the corresponding information system.

The object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

The function of the object platform is to implement the sensing and control. A sensor unit of a sensor device senses sensory information and realizes the sensing function; through the sensor network platform, the management platform and the service platform, the sensory information is transmitted to a user through the operation of the smart city system architecture; the user converts the sensory information to control information; the control information is transmitted to a control device of the object platform via the service platform, the management platform, and the sensor network platform; and the control is performed by a control unit of the control device, thereby forming a closed-loop information structure.

The function of the smart city sensor network platform is to implement the mutual communication between the object platform and the management platform. The communication module of the sensor device sends the sensory information obtained by the sensor device to an IoT intelligent gateway, and the IoT intelligent gateway transmits the sensory information to an operator communication server through the public network, thereby completing the communication of the sensory information in the sensor network platform. The operator communication server sends the control information to the IoT intelligent gateway through the public network, and the IoT intelligent gateway sends the control information to the communication module of the control device, thereby completing the communication of the control information in the sensor network platform.

The management platform processes, stores, classifies, identifies and analyzes the information in the smart city system architecture, thereby achieving the management functions, and providing a support for the service system. The management platform is an integrated management platform of the whole smart city system architecture.

The management platform corresponds to the management domain in the information structure; and the management domain includes a sensory information management system and a control information management system. The management platform corresponds to an operator management server and various facilities connected to the server in the physical structure. The management platform is the carrier of the sensory information management system and the control information management system in the information structure.

The service platform is a platform to provide services for users and realizes service functions, including a public government service platform, a public social network service platform, and an operator service platform.

The service items of the service platform include public services and operator services.

The smart city service platform corresponds to the service domain in the information structure, and corresponds to three parts of content in the physical structure, the first is an operator service platform server, the second is a government server, and the third is a public social network server.

The function of the user platform is a platform for users to enjoy the services of the smart city system architecture. The users use various user terminals to realize the output of their own needs and enjoy the services of the whole smart city system architecture through human-computer interaction.

Figure 8:
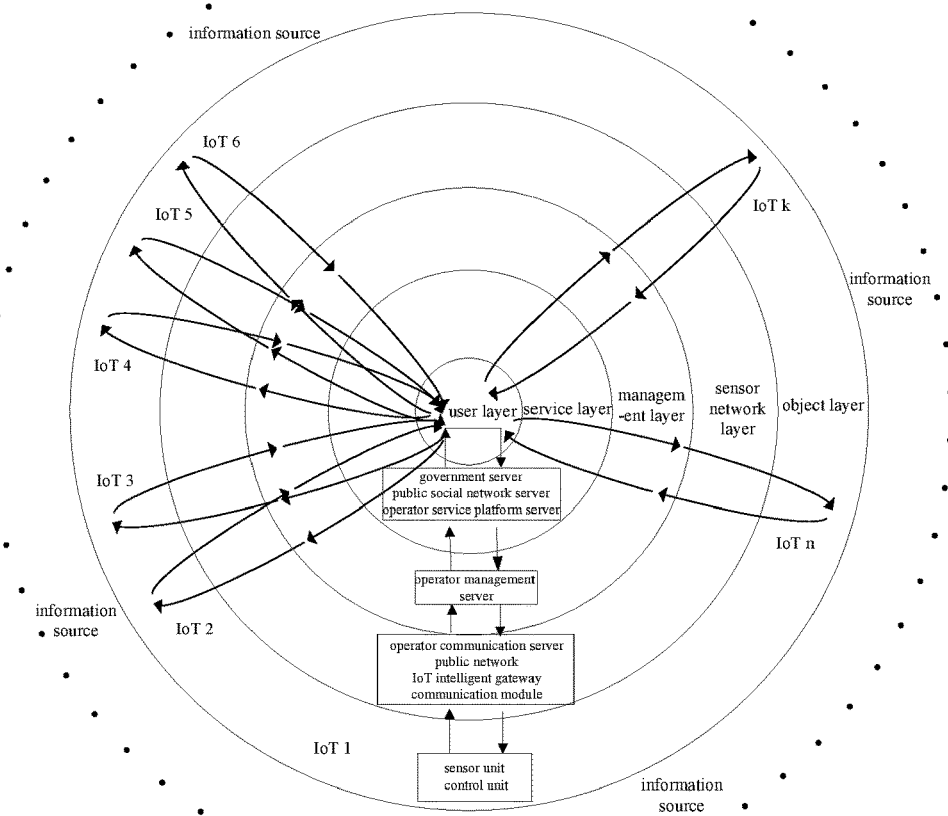
FIG. 8 is a structural diagram of a smart city physical system.

As shown in FIG. 8, the physical system includes an object layer, a sensor network layer, a management layer, a service layer, and a user layer. A complete smart city physical system architecture is formed through the interconnection between the various physical layers, thus supporting the complete operation of information in the smart city and finally realizing the functions of the smart city.

Figure 9:
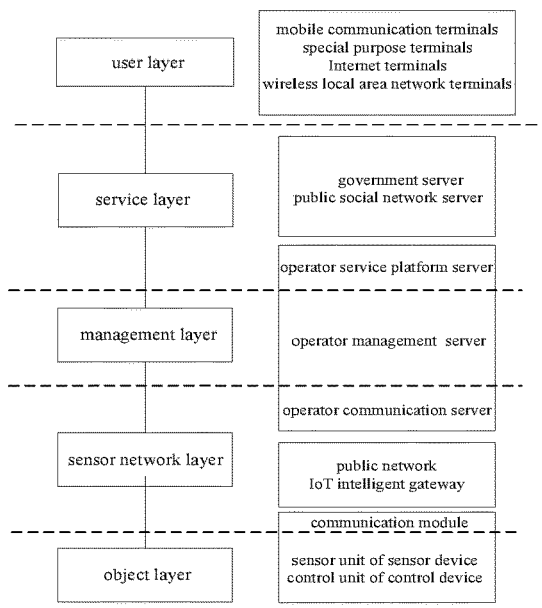
FIG. 9 is a schematic diagram of smart city physical entities.

The smart city physical entities are shown in FIG. 9. According to the structure of the smart city physical system, the smart city physical entities are introduced as follows.

The smart city is composed of various user-centered smart city service sub-systems. Each service sub-system is a complete IoT five-domain structure. Various service sub-systems are arranged around the users. According to different information, the information is divided into five layers from the inside to the outside, thus forming a smart city. The urban information system is a user-centered five-domain ring structure.

The physical system is the carrier for the information operation in the information system, therefore, the structure of the physical system corresponds to the information system.

The object layer is a layer where carrying entities carrying all object information in the smart city are located. The object layer refers to the sensor unit of the sensor device and the control unit of the control device, possessing a sensing function and a control function. The sensor device and the control device may be a single device that performs sensing and control together, or may be two different devices that respectively perform sensing and control.

The sensor network layer includes a communication module of the sensor device, a communication module of the control device, an IoT intelligent gateway, a public network, and an operator communication server. Through a sensor network composed of the communication module of the sensor device, the communication module of the control device, the IoT intelligent gateway, the public network and the operator communication server, the mutual communication between the sensor network layer and the operator management server can be realized.

The core of the management layer is the server, including the operator management server and other related facilities.

The service layer includes the government server, the public social network server, and the operator service platform server.

The user layer is a facility that provides physical support for the functions of the user platform, mainly including various terminal facilities, such as mobile communication terminals, special purpose terminals, Internet terminals, or wireless local area network terminals.

Figure 10:
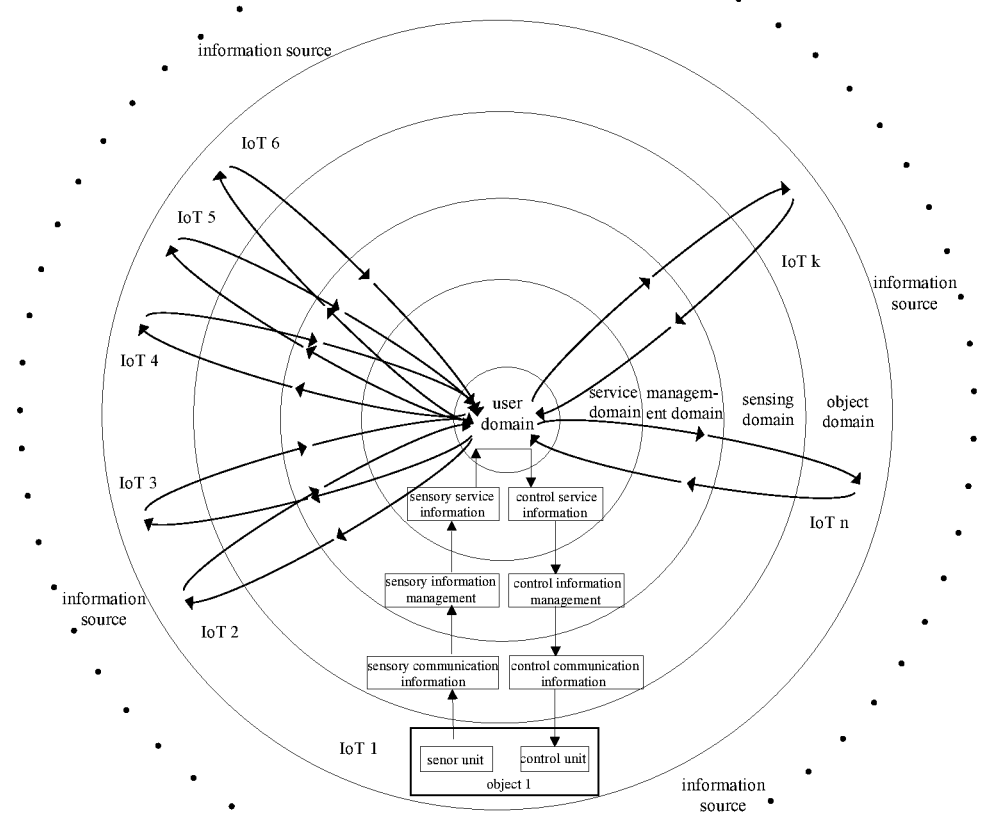
FIG. 10 is a structural diagram of a smart city information system.

As shown in FIG. 10, the function of the information system is to realize the operation of information in the smart city system architecture.

The smart city is composed of various user-centered smart city service sub-systems. Each service sub-system is a complete IoT five-domain structure. Various service sub-systems are arranged around the users. According to different information, the information is divided into five layers from the inside to the outside, thus forming a smart city. The urban information system is a user-centered five-domain ring structure.

The information in the object domain includes the sensory information and the control information; the sensory information is derived from an information source, and the control information is issued after passing through the smart city system architecture.

The sensing domain is a collection of various communication information in the smart city, including sensory communication information and control communication information. The sensory communication information is information for communicating the sensory information uploaded by the object domain, and the sensory communication information is provided by a sensory information communication system; and the control communication information is information for communicating the control information issued after passing through the smart city system architecture, and the control communication information is provided by a control information communication system.

The management domain is a collection of various management information in the smart city, including sensory management information and control management information. The sensory management information is provided by a sensory information management system; and the control management information is provided by a control information management system. The management domain is an information guarantee for the orderly operation of the smart city.

The service domain is a collection of various service information in the smart city, including sensory service information and control service information. The sensory service information is provided by a public social sensory service system, a government sensory service system, and an operator sensory service system; and the control service information is provided by an operator control service system.

The user domain includes a variety of relevant user information.

The smart city sub-system can be divided into different levels of smart city sub-systems. The previous level smart city sub-system includes at least one next level smart city sub-system and/or at least one IoT system; and the lowest level smart city sub-system is composed of at least one IoT system.

Figure 2:
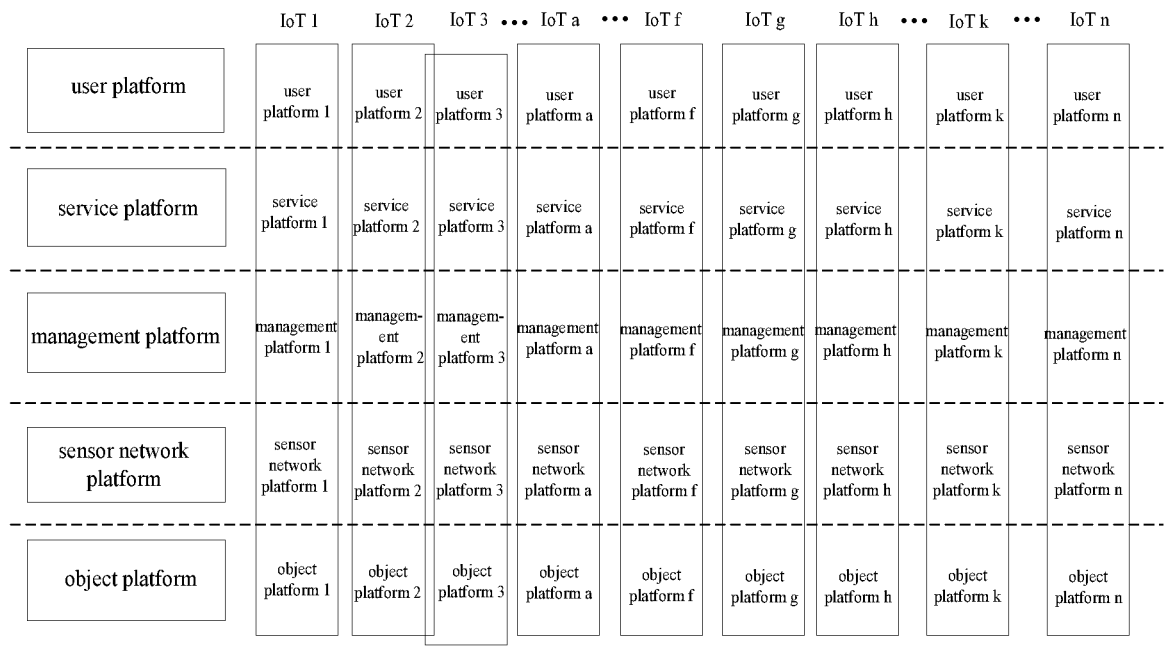
FIG. 2 is a structural diagram of a smart city functional system.

Moreover, it can be seen from FIGS. 2, 8 and 10 that in the smart city system architecture, the smallest unities of the components of the smart city functional system, the smart city physical system and the smart city information system are the corresponding functional system of the IoT system, the physical system of the IoT system, and the information system of the IoT system, respectively. This also reflects the basic position and role of the IoT system in the smart city system architecture.

There are juxtaposition, intersection or inclusion forms among smart city sub-systems. At the same level, smart city sub-systems are in a juxtaposition or intersection relationship; and at different levels, smart city sub-systems are in a juxtaposition or intersection or inclusion relationship. The intersection or inclusion relationship is finally reflected in the information sharing among smart city sub-systems.

The IoT system also includes a functional system, a physical system, and an information system.

The functional system is an expression form of functions of the IoT system; the information system is an implementation way of the functions of the IoT system; and the physical system is a physical support carrier for the implementation of the functions of the IoT system.

The functional system has a five-platform structure, including: an object platform, a sensor network platform, a management platform, a service platform, and a user platform; the physical system has a five-layer structure, including: an object layer, a sensor network layer, a management layer, a service layer, and a user layer; and the information system has a five-domain structure, including: an object domain, a sensing domain, a management domain, a service domain, and a user domain.

The function of each platform in the functional system is implemented through the supports of physical entities in the corresponding physical system and the operation of information in the corresponding information system.

The object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

The smart city system architecture possesses openness. The object platform, sensor network platform, management platform, service platform and user platform in the functional system include a plurality of object sub-platforms, a plurality of sensor network sub-platforms, a plurality of management sub-platforms, a plurality of service sub-platforms and a plurality of user sub-platforms, respectively.

The plurality of object sub-platforms jointly form the object platform of the smart city, and jointly exhibit the comprehensive sensing and control functions of the smart city. The object sub-platforms are divided into different levels of object sub-platforms. The previous level object sub-platform includes at least one next level object sub-platform and/or at least one object platform of a single IoT system; and the lowest level object sub-platform is composed of at least one object platform of a single IoT system.

The plurality of sensor network sub-platforms jointly form the sensor network platform of the smart city to realize communications of sensory information and control information between the object platform and the management platform in the smart city system architecture. The sensor network sub-platforms are divided into different levels of sensor network sub-platforms. The previous level sensor network sub-platform includes at least one next level sensor network sub-platform and/or at least one sensor network platform of a single IoT system; and the lowest level sensor network sub-platform is composed of at least one sensor network platform of a single IoT system.

The plurality of management sub-platforms together form the management platform of the smart city to realize integrated urban management in smart city system architecture. The management sub-platforms are divided into different levels of management sub-platforms. The previous level management sub-platform includes at least one next level management sub-platform and/or at least one management platform of a single IoT system; and the lowest level management sub-platform is composed of at least one management platform of a single IoT system.

The plurality of service sub-platforms together form the service platform of the smart city to realize the service function of the smart city. The service sub-platforms are divided into different levels of service sub-platforms. The previous level service sub-platform includes at least one next level service sub-platform and/or at least one service platform of a single IoT system; and the lowest level service sub-platform is composed of at least one service platform of a single IoT system.

The plurality of user sub-platforms together form the user platform of the smart city to realize the function of the smart city to provide services to users. The user sub-platforms are divided into different levels of user sub-platforms. The previous level user sub-platform includes at least one next level user sub-platform and/or at least one user platform of a single IoT system; and the lowest level user sub-platform is composed of at least one user platform of a single IoT system.

As can be seen from FIGS. 2-7, the IoT system is the most basic unit of the smart city system architecture. There is also an organic combination between the Internet of Things systems. First, minimum levels of smart city sub-systems are formed among a plurality of IoT systems; and previous levels of smart city sub-systems are formed among a plurality of minimum levels of smart city sub-systems, and so on, ultimately forming the entire smart city system architecture.

In the functional system of the smart city of the present invention, the object platform at the lowest level is the starting point of the functional system architecture, supporting the entire functional system architecture. The sensor network platform is the bridge connecting the object platform and the management platform in the functional system architecture. The management platform is the center of the entire functional system, determining the realization of functions of the smart city. Above the management platform is the service platform, and the service platform realizes the information sharing and exchange among the various sub-systems of the smart city while ensuring the privacy of the smart city sub-systems. Above the service platform is the user platform, and the user platform provides a guarantee for users in the smart city to realize human-computer interaction. The normal operation of the functional system of the smart city is completed under the organic combination and close cooperation of the five platforms, namely, the object platform, the sensor network platform, the management platform, the service platform and the user platform.

The functional system of the smart city reveals the whole process of realization of the functions of the smart city from an overall perspective. The realization of the functions of the smart city needs the support of the infrastructures in the smart city. For example, the sensing and control functions of the object platform are achieved by the intelligent sensing device having sensing and control functions; the communication function of the sensor network platform is realized by the communication server; the management function of the management platform is achieved by the device such as management server, etc.; and the user platform requires various APPs, software, etc. with application functions to complete the function such as human-computer interaction. All the basis facilities for realizing the smart functions of the smart city are physical entities. The realization of functions of different platforms in the smart city functional system requires the support of different types of physical entities. According to the functional system architecture of the smart city, the corresponding physical system architecture of the smart city is constructed, namely: the object layer, the sensor network layer, the management layer, service layer and the user layer.

The physical entities of the object layer are used to implement the sensing and control functions of the object platform. Therefore, the physical entities of the object layer are substances having sensing and/or control function(s), that is, the object can be a substance having only a sensing function, a substance having only a control function, or a substance having both sensing and control functions. The physical entities of the object layer cover all fields of the smart city that realize the intelligent functions of the smart city, and all fields in the smart city have their own physical entities that realize the sensing and control functions. In the functional system of the smart city, the platform connected to the object platform is the sensor network platform; correspondingly, in the physical system, the layer connected to the object layer is the sensor network layer. The sensor network layer contains a variety of communication devices for transmitting information, and the communication function of the sensor network platform is realized by these devices. The sensor network layer is the first level of information transmission of the object layer, and the communication devices of the sensor network layer can receive, store and forward information with heavy traffic. In addition, since the information received by the communication device needs to be further transmitted to other layers, the communication device has a function of communication protocol conversion. The structure of the upper layer of the sensor network platform in the smart city functional system is the management platform; correspondingly, the upper layer of the sensor network layer in the physical system is the management layer. The management layer has various facilities for implementing the business management functions of the management platform. These facilities mainly refer to various management servers, and the various management servers are composed of various hardware and software systems. The management servers are mainly operated, maintained, managed and controlled by operators in various functional fields of the smart city. The management servers of the management layer are the necessary supports for the realization of the functions of the smart city functional system. The service layer of the physical system corresponds to the service platform of the functional system, and the service layer is above the management layer. Correspondingly, the service layer requires the physical entities to implement the two functions, that is, the physical entities of the service layer include the public social network server, the government server and the operator service platform server. The user platform is a platform to ensure the realization of human-computer interaction in the smart city. The implementation of this function is performed by the user layer structure in the physical system. The user layer is located above the service layer, and the physical entities corresponding to the user layer are interactive devices that support user access and facilitate the use of services of the smart city. From the perspective of the communication access mode, the physical entities of the user layer include mobile communication terminals, Internet terminals, special purpose terminals, and wireless local area network terminals. Since the users of the smart city include the individuals who live in smart city, the builders of the city, and the managers of the city, different users may use different physical entities.

The smart city functional system has a five-platform structure, each platform has corresponding function, and the five platforms are connected to each other to jointly complete the smart functions of the smart city. The physical system of the smart city is the support of the functional system of the smart city. Without the physical system, the functions of the smart city cannot be realized. According to the five-platform functional system of the smart city, the physical system of the smart city is divided into five physical layer structures. The physical layer and the platforms of the functional system have a one-to-one correspondence, and each physical layer supports the function realization of the platform in the corresponding functional system. Because the platforms of various functional systems are interconnected and interdependent, it is impossible for various physical layers to be independent from each other, and there is an interaction between the various physical layers. The interaction between the various physical layers is mainly realized by the information circulation of each physical layer. Each physical layer has an interface for information circulation, and the circulation of the information in various physical layers creates conditions for the interconnection and mutual communication of physical layers. In the smart city, because of the circulation of information in various physical layers, the function of widely connecting physical entities in the various functional fields of the smart city is realized, and then the in-depth analysis and accurate control of the smart city are realized. It can be said that the operation of information in the smart city makes the physical entities "live". Only with the operation of information can physical entities have corresponding value and significance.

The physical system of the smart city is a five-layer structure, including the object layer, the sensor network layer, the management layer, the service layer, and the user layer from bottom to top. Accordingly, the information system of the smart city is a five-domain structure, including object domain, sensing domain, management domain, service domain and user domain from bottom to top. There is a one-to-one correspondence between the five-domain structure of the information system and the five-layer structure of the physical system of the smart city. The object domain corresponds to the object layer, the sensing domain corresponds to the sensor network layer, the management domain corresponds to the management layer, the service domain corresponds to the service layer, and the user domain corresponds to the user layer. Smart city needs to realize both comprehensive sensing and accurate control, so smart city needs two forms of information, one is sensory information, and the other is control information. The sensory information is various information sensed by the sensing system of the object layer, for example, information of brightness, current, indoor temperature, humidity, etc. sensed by household appliances equipped with sensor devices in the field of home furnishings, information of flow, pressure, magnetic environment, earthquakes, etc. sensed by intelligent gas meters, water meters, etc. in the energy field, and information of geographic location, etc. sensed by cars installed with GPRS. Control information is control information sent by the user layer in order to perform corresponding control, for example, control information for controlling the turning on/off of household appliances, controlling heating and cooling of air conditioner, controlling refrigerator temperature, controlling opening and closing of curtains, etc. in the field of home furnishings, and control information for controlling on/off valve of the natural gas meter and water meter, controlling natural gas meter and water meter to issue alarm prompt, etc. in the energy field. Object domain and user domain are the two poles of the smart city information system structure. Specifically, the object domain is the starting point for sending the sensory information, and is the end point for receiving the control information; and the user domain is the end point for receiving the sensory information, and is the starting point for sending the control information. It can be seen that in the information system of the smart city, the operation of the sensory information starts from the object domain, then the sensory information passes through the sensing domain, the management domain, and the service domain, and finally reaches the user domain; the operation of the control information starts from the user domain, then the control information passes through the service domain, the management domain, and the sensing domain, and finally reaches the object domain. Therefore, in the information system, the operation of information forms a closed loop. In this closed loop, the operation of sensory information is performed from bottom to top, and the operation of control information is performed from top to bottom.

The ultimate goal of building smart city is to give full play to the functions of smart city and provide services for human beings. Therefore, the functional system is the center of the construction of smart city system architecture, and the construction of smart city system architecture must take the construction of functional system as the starting point and standpoint. The realization of the functions of the smart city must rely on the support of physical entities. Without the construction of physical entities, the construction of smart city functional system is just an empty talk. Therefore, the physical system is the foundation for the construction of smart city functional system. In the physical system, it is necessary to have the function of information circulation between physical entities. Without the circulation of information between physical entities, no matter how rich and perfect physical entities the physical system has, the functions of the smart city cannot be realized, and therefore the information system is also an indispensable part of the construction of smart city system architecture. Therefore, the smart city system architecture includes: functional system, physical system, and information system. Any one of the functional system, the physical system and the information system in the smart city system architecture is indispensable. The functional system is the center, indicating the direction for the top-level design of the smart city, so the functional system is located at the center of the smart city system architecture. The physical entities in the physical system provide support for the realization of the functions of smart city; and the operation of information in the information system provides a way to realize the functions of smart city. Therefore, the physical system and information system are closely around the functional system and are located on both sides of the functional system. The functional system of the smart city has a five-platform structure, including: an object platform, a sensor network platform, a management platform, a service platform, and a user platform; the physical system of the smart city has a five-layer structure, including: an object layer, a sensor network layer, a management layer, a service layer, and a user layer; and the information system of the smart city has a five-domain structure, including: an object domain, a sensing domain, a management domain, a service domain, and a user domain. Since each platform of the five platforms in the functional system has its own platform function, the implementation of each platform function should have the support of the corresponding physical entity and the operation of the information in the corresponding information domain. Therefore, in a diagram of a smart city system architecture, the object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

As shown in FIG. 2, the functional system architecture of the smart city is accomplished by the organic combination of a plurality of IoT functional system architectures. Since the smart city is a huge and complex system, it is impossible to complete all the functions of the smart city by relying on only one Internet system. Therefore, a single IoT functional system architecture forms the foundation of the functional system architecture of the smart city. When constructing a smart city functional system architecture by the IoT functional system architectures, some IoT functional system architectures are in juxtaposition relationship, such as, the IoT 1 and the IoT a in FIG. 2, some IoT functional system architectures themselves are organically combined, such as IoT 2 and IoT 3, which also reflects the complexity of the smart city functional system architecture. However, from the overall consideration, it is reasonable and scientific to divide the smart city functional system architecture into five platforms, including object platform, sensor network platform, management platform, service platform and user platform.

The platforms of the smart city functional system and related sub-platforms will be further discussed in detail below.

1. Object Platform

The smart city object platform is the interface where the association between everything in the smart city and the IoT system occurs. The function of the object platform is to implement the sensing and control. The sensor unit of the sensor device senses sensory information and realizes the sensing function; through the sensor network platform, the management platform and the service platform, the sensory information is transmitted to a user through the operation of the smart city system architecture; the user converts the sensory information to control information; the control information is transmitted to a control device via the service platform, the management platform, and the sensor network platform; and the control is performed by the control unit of the control device, thereby forming a closed-loop information structure. Anything with sensing and control functions can be an object. The object can be a person, a substance, or a combination of person and substance; the object can be an individual or a collection of several individuals, a category of individuals, or an IoT system composed of several individuals.

Generally, the sensing function of the object platform is implemented by the sensor unit of the sensor device, and the control function is implemented by the control unit of the control device. The sensor device and the control device can automatically implement self-control, and can also implement control according to the received control information. When the object is a smart object, the sensing function and the control function are realized by the sensor unit and the control unit therein; when the object is a person, the sensing function and the control function are realized through the human body's sensory organs and control nerves; and when the object is a combination of persons and substances or a group of people, the sensing and control functions are realized through interpersonal communication.

Technical Method of Implementation:

The main function of the object platform is to realize the sensing and control functions. The sensing and control functions are realized by respective sensing device and control device. The sensor unit of the sensor device senses the sensory information, and the sensory information is transmitted to the sensor network platform by the communication module; when the sensor network platform issues the control information, the communication module of the control device receives the control information, and the control is performed by the control unit of the control device.

1) Sensing Function

The sensing function of the object platform is the premise of the existence of the Internet of Things. Without sensory information, the Internet of things would be impossible, and the operation thereof is even less possible. The sensing function of the Internet of Things is realized through various sensing technologies. Different types of sensory information require different sensor devices or sensing technologies. According to different types of sensory information, sensing functions include the sensing of IP audio and video information and the sensing of non-IP audio and video information. The sensing of IP audio and video information mainly refers to information sensed by the camera, and most sensory information is the non-IP audio and video information, such as label reading and writing, location acquisition, radio frequency identification, QR code scanning, and sensor devices including pressure sensors, temperature sensors, humidity sensors, flow sensors, liquid level sensors, force sensors, acceleration sensors, and torque sensors, etc. used for measuring various physical quantities.

The object platform is the entrance of IoT system to acquire external information; and the sensing function of the object platform is an important means for the object platform to acquire the sensory information. Therefore, the level of sensing technology determines the comprehensiveness of the sensory information of the object platform, and further determines the richness of the content of the IoT system. The control function of the object platform is to execute the control information obtained after the sensory information subjected to the operation of the whole IoT system.

2) Control Function

Generally, the control function of the object platform is implemented by the control device. The control device can automatically implement self-control, and can also implement control according to the received control information. When the object is a smart object, the control function is realized by the control unit therein. Intelligent control refers to the realization of the function of automatically implementing a certain kind of control or self-control without external interference. When the object is a person, the control function is realized through the human body's control nerves; and when the object is a combination of persons and substances or a group of people, the control function is realized through interpersonal communication.

In smart cities, intelligent control technology can be seen everywhere, such as smart home central control system, including an intelligent centralized control of a series of smart home central control system like ambient lighting systems, home theater audio-visual system, security monitoring systems, public broadcasting/background music system, air conditioning systems, electric curtains, etc.

2. Sensor Network Platform

As the name implies, the function of the sensor network platform is communication, and the smart city sensor network platform is mainly to realize the mutual communication between the object platform and the management platform. Communication refers to the efficient delivery of messages from one place to another. In smart cities, telephone, Internet and other forms of electrical communications are mainly used. Among various communication methods, a communication method that uses "electrical signals" to carry messages is called electrical communication. Through this kind of communication, useful information is transmitted efficiently without distortion, and useless information and harmful information are suppressed during transmission. Moreover, this kind of communication has functions such as storage, processing, acquisition and display, and has characteristics of fast, accurate, reliable, and almost not limited by time, place, space, or distance, therefore, this kind of communication has been rapidly developed and widely used.

At present, the communication of smart cities is dominated by electrical communication, using electrical signals to carry information, and transmitting electrical signals through communication networks to achieve information transmission. The communication network is a system that uses switching device, transmission device to interconnect geographically dispersed user terminal devices by various communication means and certain connection modes to realize communication and information exchange. The sensor network platform of the smart city corresponds to the sensing domain in the information structure. The physical entity includes four parts: the communication module of the sensor device and the communication module of the control device, the IoT intelligent gateway, the public network and the operator communication server. The IoT intelligent gateway is different from the existing ordinary gateway, but an IoT intelligent gateway with intelligent management functions. The public network mainly refers to the mobile public network, the Internet, etc. The sensor network platform realizes the interaction of various sensory information and control information between the object platform and the management platform in the smart city IoT system.

The sensor network platform of the smart city IoT system is a combination of sensor network platforms of the IoT systems in all industries. The sensor network platform is connected to the object platform through the sensor device and the control device, and is connected to the management platform through the communication server of the management platform. The communication module of the sensor device sends the sensory information to the IoT intelligent gateway, and the IoT intelligent gateway transmits the sensory information to the operator communication server through the public network; after processed by the operator management platform, the sensory information is transmitted to users through the service platform; the user sends out control information, and the control information is transmitted to the operator communication server through the service platform; after processed by the management platform, the control information is transmitted to the IoT intelligent gateway through the public network by the operator communication server; the IoT intelligent gateway gathers the information, distributes the information to the communication module of the control device, and then the object is controlled by the control device.

The sensory information uploaded by the object platform includes many different types, such as audio information, video information, geographic information, data information, control information and other information. Different information has different transmission interfaces, and various kinds of information are transmitted to the IoT intelligent gateway through their respective interfaces. The gateway uses the acquisition adapter and data transmission function to perform data storage of the sensory data, and performs some protocol conversions, routing, application registration, etc., which can implement some management functions such as device configuration, identification, state management, application management, performance management, security, etc. The gateway processes the information and then transmits the information through the Internet, mobile communication network, satellite communication network, PSTN, IP network and other networks.

3. Management Platform

The smart city management platform processes, stores, classifies, identifies and analyzes the information in the smart city system architecture, thereby achieving the management functions, and providing a support service for the service system. The management platform is an integrated management platform of the whole smart city system architecture. The smart city management platform corresponds to the management domain in the information structure; and the management domain includes a sensory information management system and a control information management system. The management platform corresponds to an operator management server and various facilities connected to the server in the physical structure. The management platform is the carrier of the sensory information management system and the control information management system in the information structure. The operator management server may be a plurality of operator servers providing the same service, a plurality of operator servers providing different services, or a specific operator server providing a specific service.

The management platform of the smart city refers not only to the management software platform, but also to a management system, which is a combination of tangible and intangible management systems used in the operation of smart city. The most important role of the platform is to give full play of utilization of urban resources. The core task of the platform is to comprehensively manage the smart city IoT system, including basic management and application management. The basic management refers to the management of the operation of the IoT management system and management of relevant background data of the system. The application management refers to an integrated acceptance of the sensory information of the object platform sent by the sensor network platform and the control information sent by the user platform by the operator integrated management system. The management of the management platform is mainly reflected in the integration, classification and processing of various types of information, the comprehensive processing of the sensory information and control information by using a well-designed software program, or the completion of the conversion between the sensory information and control information.

The smart city management platform is implemented by the following technical methods.

The IoT management platform realizes management functions of various professional systems by performing data collection, protocol conversion, data storage processing, data sharing, and business process grooming on various kinds of sensory and control information, public service information, network communication, etc., providing services for the production and operation of enterprises, thus realizing the functions of the management platform. The functions of management platform include basic management functions and application management functions. Basic management functions include: exchange of information resources, exchange of market resources, regulatory supervision, maintenance of operation, integration of public data, storage of public data, processing of public data, access of public data, identification management service, geographic information service, service management, user service management, etc. Application managements refer to the managements of information related to users, such as the collection, identification, analysis, processing and other management functions of the sensory information uploaded by the sensor network platform, and the identification, analysis, processing and other management functions performed on the control information issued by users through the service platform.

In the smart gas sub-system of the smart energy system, the gas company management platform is the management platform of the smart gas sub-system. The gas company management platform realizes the integrated management of the whole smart gas sub-system, which also includes basic management and business management. Basic management refers to the management of the operational data of the smart gas sub-system, and some related background processing. Business management refers to the integrated management of gas business, including account opening. For example, when the remaining volume of pre-stored gas of a meter terminal of the gas meter is insufficient, the gas meter will automatically upload the information that the gas remaining volume is insufficient, i.e., the sensory information; the sensory information is transmitted to the management platform through the sensor network platform; after the management platform identifies and analyzes the sensory information, the information of insufficient gas volume is transmitted to the user platform through the service platform; after receiving the information of insufficient gas volume, the user makes a judgment of needing recharge, and transmits a recharge instruction and a recharge amount to the management platform through the service platform; the management platform sends the recharge instruction to the meter terminal according to the user's recharge instruction and the recharge volume; and the pre-purchased gas volumes of the meter terminal is accumulated, thereby completing the remote recharge. During this process, the gas company management platform not only analyzes, processes the information of insufficient gas volume sensed by the meter terminal, and then converts the information into a form that can be accepted by users to transmit to users, but also analyzes, processes the recharge information of users, and converts the information into a form that can be identified by control module of meter terminal, thus completing the control of the meter terminal.

4. Service Platform

The smart city service platform is a platform that provides services to users and implements service functions. The services include public services and operator services. Public services are government-led, providing public information resources and data processing services for smart city system architecture, such as information resources, market resources, regulatory supervision, public data, etc. Operator services are operator business services provided by operators.

The smart city service platform corresponds to the service domain in the information structure; and the service domain includes a public social sensory service system, a government sensory service system, an operator sensory service system, and an operator control service system. The smart city service platform corresponds to three parts of content in the physical structure, the first is a public social network server, the second is a government server, and the third is an operator service platform server. The operator service platform server may be a plurality of operator service platform servers providing the same service, a plurality of operator service platform servers providing different services, or a specific operator service platform server providing a specific service.

Technical Method of Implementation:

The service platform accesses, exchanges, and routes various basic services and resources through the service bus to provide public services for users, which realizes the interconnection and interworking of messages, data, events and services in an integrated way.

The service platform allows various basic services to be registered or deregistered in the service platform through service registration management. The service platform provides transmission guarantee for the exchange of messages, data, events, and services between the platform and users through service transmission management. The service platform converts various types of data through protocol conversion services, stores and processes them, thereby providing big data services for users.

Service quality management and service security management implements service security certification, authentication, service QOS monitoring, etc., to ensure service quality.

Actually, the service platform of the smart city is big data. With the development of e-commerce, Internet of Things, social networks, etc., new data sources and data collection technologies are emerging, which leads to an increasing number of data types in various industries. Various unstructured data has increased the complexity of big data.

5. User Platform

The function of the IoT user platform is for users to enjoy the services of the IoT system. The users use various user terminals to realize the output of their own needs and enjoy the service of the whole IoT system through human-computer interaction.

The function of the smart city user platform is to enable users to enjoy the services of the smart city system architecture. The user platform corresponds to the user domain in the information structure, and corresponds to the user terminal in the physical structure. The users use various user terminals to realize the output of their own needs and enjoy the service of the whole smart city system architecture through human-computer interaction.

Users of the user platform can be individual users, user groups, persons, things, enterprises or governments. As long as it is an object of the service structure of the smart city system, it is the user. In the information structure, users refer to all subjects accepting the services of the smart city system architecture, which is an abstract concept. In the physical structure, the user refers to a specific user, which can be a large number of users who enjoy the same service, a large number of users who enjoy different services, a user who enjoys a variety of different services, or a specific user who enjoys a specific service.

Technical Method of Implementation:

The service platform provides public services for users through networks (such as INTERNET, 2G/3G/4G, satellite networks, and other networks). The types of service information include audio, video, public services, payments, GIS maps, business data, device status, network topologies, etc. Users receive service information through web pages, dedicated customer interfaces, APPs, computers and other methods.

For the smart city, the user community is very complex and diverse, and the needs of users are also involved in various fields of the industry. The degree of richness of the functions of the user platform directly determines the intelligent level that users enjoy the services, and determines the degree of adequacy of human liberation. Through the user platform, functions such as personal account network inquiry, remote control of household energy, and remote control of smart home system can be realized.

1) Personal Account Network Inquiry

In order to ensure the information security and privacy of users, users in smart cities need to register a proprietary account for most of the remote control, and then log into the corresponding system for a series of operations. For example, gas users in smart energy can log into the smart energy system to conduct personal account information inquiry, balance inquiry, historical consumption record inquiry, gas price information inquiry, etc. People who need to travel in a smart city can log into their account of a taxi software APP to check the available vehicles nearby, as well as the relevant information of the vehicles and the drivers, and then select one of the vehicles according to their own needs to complete the taxi calling procedure. In the smart medical system, when patients are users, the patients can log into the smart medical system to query the personal data, areas of expertise, successful cases, number of appointments, and home visits, etc. of doctors in various departments; when doctors are users, the doctors can log into the smart medical system to query the patient's medical record, treatment progress, appointment information, online diagnosis and treatment data (blood pressure, blood glucose, blood lipid, pulse, etc.), and simply and timely grasp the patient's information, so as to quickly make a diagnosis plan.

2) Remote Control of Household Energy

Household energy includes household water, household electricity, household gas, and household heating supply. The most indispensable part of the daily life of the residents is water, electricity, gas and heat, therefore, the intelligentization of household energy is a real benefit for the people. In the smart household energy system, people can use the user platform to conduct related inquiries and remote control of the use conditions of water, electricity, gas and heat in their homes. Taking the smart household gas system as an example, users can log into the smart gas system to query the gas consumption and account balance through the user platform, and recharge remotely through the recharge system of the user platform; and the gas company management platform receives the user's recharge information, and sends a control instruction to the user's meter terminal to accumulate the gas remaining volume, thereby completing the recharge. For example, if a user is not at home for a long period of time because of a business trip, and there is no use of gas for a long time, in consideration of indoor safety, the smart gas meter will automatically turn off the valve; the user obtains the valve off information sensed by the meter terminal through the user platform, and if the valve needs to be turned on for continuous using the gas, the user can apply to turn on the valve through the user system of the user platform; and the gas company will confirm the safety of the meter terminal and then turn on the valve according to the user's request.

3) Remote Control of Smart Home System

Smart home is a branch of a smart city and is closely related to people's daily life. In smart home, various intelligent control technologies are generally applied to various home furnishings, providing people with more intelligent, more comfortable, more convenient services. The intelligent control of smart homes does not need to go through the user most of the time, but the smart home directly makes intelligent control based on the sensory information, adjusts its own parameters, and provides the best service mode for people. These intelligent controls are all for the consideration of the benefit of the user, which is to improve the comfort and convenience of users. It can be said that these controls of the smart home are recognized and agreed by the users, or are authorized by the users in advance. In essence, the intelligent control process of smart home is actually the operation process of a complete IoT system, and the smart home also includes the complete five-domain structure. Therefore, the essence of smart home is the Internet of Things, and is a special sub-system of smart city, called smart home sub-system.

The smart city function system includes five functional platforms, i.e., object platform, sensor network platform, management platform, service platform and user platform. Since the smart service functions of smart city are realized by the huge composite IoT system composed of numerous large and small Internet of Things in the city, the functional platform in the smart city functional system also is a composite functional platform composed of functional platforms in these numerous large and small Internet of Things. According to different industries, different fields and different products in human activities, the five functional platforms can be successively divided into different levels of sub-platforms. First, from the industry or field, for example, the five functional platforms of smart city can be divided into a first level of smart traffic sub-platform, smart medical sub-platform, smart energy sub-platform, smart government sub-platform, smart environmental protection sub-platform, smart home sub-platform, smart education sub-platform, smart community sub-platform, smart urban management sub-platform, smart tourism sub-platform, smart logistics sub-platform, etc.; and the sub-platforms include various industries and fields of urban life. In the same industry or field, according to different products or characteristics, the sub-platforms can be further divided to form a second-level smart city sub-platform. For example, in the field of smart energy, according to different energy sources, the smart energy sub-platform can be divided into smart electric energy sub-platform, smart gas sub-platform, smart water sub-platform, and smart heat energy sub-platform. Similarly, the second-level smart city sub-platforms can continue to be subdivided to form a next-level smart city sub-platform. For example, the smart gas sub-platform can be subdivided into a smart public gas sub-platform and a smart household gas sub-platform.

In a word, in urban activities, people can build a composite IoT system in various industries and fields according to their own needs, thereby realizing various smart service functions; and all of these smart service functions in various industries and fields will be integrated on the five functional platforms of the smart city composite IoT system. Therefore, the functional platform of smart city possesses openness, and people can continuously add more smart service functions to the functional platform as needed, thereby eventually forming a smart city with diversified functions.

1. Object Sub-Platform

Figure 3:
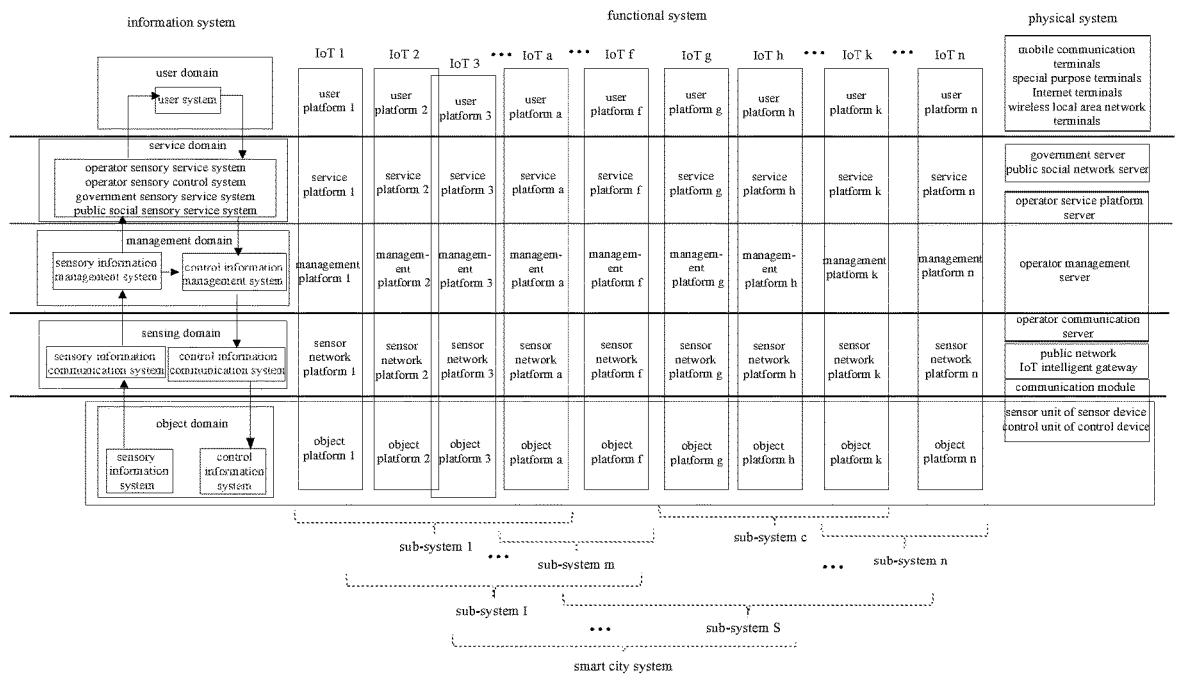
FIG. 3 is a diagram of a smart city object sub-platform.

As shown in FIG. 3, the smart city object platform is a platform for implementing sensing and control functions in the smart city composite IoT system; and all sensing and control functions are reflected in the object platform. The smart city object platform is composed of many different levels of object sub-platforms. These object sub-platforms belong to different industries and different fields. They are in mutual inclusion and juxtaposition relationships, which together show the comprehensive sensing and control functions of smart city.

According to different industries and fields, the smart city object platform can be first divided into a first level of smart traffic object sub-platform, smart medical object sub-platform, smart energy object sub-platform, smart government object sub-platform, smart environmental protection object sub-platform, etc. Object sub-platforms in different industries or fields are platforms that implement sensing and control functions in the IoT systems of corresponding industries or fields. These object sub-platforms will implement different types of sensing and control functions based on the smart service needs of humans in different industries or fields. For example, in the field of transportation, people are currently facing a series of traffic status problems such as traffic congestion, backward traffic management methods, frequent traffic accidents, and parking difficulties, etc. Smart traffic construction aims to realize smart traffic management and service by constructing a smart traffic IoT system, so as to solve the above-mentioned traffic problems. In the smart traffic IoT system, the object platform thereof is one of the first-level object sub-platforms of the smart city object platform, which mainly implements the sensing of various traffic information of the whole city, such as people flow information, traffic flow information, parking lot usage information, etc. and performs smart traffic control. The implementation of the functions requires the supports of physical entities. For the smart traffic object sub-platform, the sensing function thereof is mainly realized by various sensor devices distributed in the streets and alleyways, such as cameras, ground sense coil, geomagnetic sensing rods, microwave detectors, GPS locators, RFID devices, etc.; and the control function thereof is mainly to realize traffic guidance through signal lights, electronic display screens, etc. Similarly, for the smart medical object sub-platform, it will implement sensing and corresponding control of medical-related information such as patient information, bed information, doctor information, etc. For the smart energy object sub-platform, it will implement the sensing of water, electricity, gas, heat and other energy usage information, energy security information, equipment fault information, etc, and perform corresponding control.

The smart city object platform has multiple levels. In addition to the first-level object sub-platform divided by industry or field, in the same industry or field, the first-level object sub-platform can be continuously divided according to specific products or corresponding characteristics to form a second-level object sub-platform. The second-level object sub-platform can also be further divided into a third-level object sub-platform, and so on, until reaching the object platform of a single IoT unit at a smallest level. The following is examples of the division of smart traffic object sub-platforms, smart medical object sub-platforms, and smart energy object sub-platforms.

In the field of smart transportation, smart transportation of the whole city is formed by the gradual integration of smart transportation of different districts and counties and smart transportation of different streets. Therefore, in the smart traffic composite IoT system of the whole city, the object platform can first serve as one of the first-level object sub-platforms of the object platform in the smart city composite IoT system, which is integrated with the sensing function of traffic information of the whole city and the control implementing function of traffic of the whole city. For the first-level smart traffic object sub-platform of the whole city, according to the urban transportation structure, it is formed by the integration of the object platforms of the smart traffic composite IoT systems in different districts and counties of the whole city. Therefore, these smart traffic object platforms of different districts and counties can be regarded as the second-level object sub-platforms, and each of them completes the sensing of traffic information and the execution of traffic control in the traffic range of the corresponding district and county. Similarly, for these smart traffic object sub-platforms of different districts and counties, they are integrated with the functions of object platforms of the smart traffic composite IoT system of many different streets in their respective districts and counties. Therefore, the object platforms of the smart traffic composite IoT systems of different streets in each district and county can be regarded as the third-level object sub-platforms, and each of them completes the sensing of traffic information sensing and the execution of traffic control in the traffic range of the corresponding street. Finally, due to the richness of smart traffic functions, numerous different types of single IoT units with different smart traffic service functions are included in the smart traffic composite IoT system of the same street. Therefore, the third-level smart traffic object sub-platforms of different streets are exactly composed of object platforms including these numerous single IoT units. Namely, the object platforms of these single IoT units are the smallest component units of smart city object platform in the field of smart transportation.

In the field of smart medical care, the smart medical composite IoT system of the whole city is composed of the smart medical composite IoT systems in all districts and counties; the smart medical composite IoT system in each district and county is composed of the smart medical composite IoT systems of different hospitals; and the smart medical composite IoT system of the same hospital is composed of numerous different types of single IoT units that realize various smart medical service functions. Therefore, the object platforms of the smart medical composite IoT system of the whole city can first serve as the first-level object sub-platforms of the smart city composite IoT system object platform, which are integrated with the medical information sensing function and the medical control implementing function of the smart medical composite IoT system of the whole city. For the first-level smart medical object sub-platform of the whole city, it is composed of the object platforms of the smart medical composite IoT systems in various districts and counties of the city. Therefore, the object platforms of the smart medical composite IoT systems in these districts and counties can be regarded as the second-level object sub-platforms, which mainly realize the function of sensing medical information and the function of implementing medical control in the corresponding district and county. Similarly, since the second-level smart medical object sub-platforms of different districts and counties are composed of the object platforms of the smart medical composite IoT systems of different hospitals in the corresponding districts and counties, the object platforms of the smart medical composite IoT systems of different hospitals can be regarded as the third-level object sub-platforms, which mainly realize the function of sensing medical information and the function of implementing medical control in the corresponding hospital. Finally, due to the diversity of smart medical service functions, the smart medical composite IoT system in the same hospital further includes numerous single IoT units that implement different smart medical service functions. The object platforms of these single IoT units together form the object platform of the hospital-level smart medical composite IoT system. Namely, the object platforms of these single IoT units are the smallest component units of the smart city object platform in the field of smart medical care.

In the field of smart energy, first of all, according to the different types of energy, energy can be divided into four types, i.e., water, electricity, gas, and heat; according to the different nature of energy usage, energies can be divided into public energy and household energy. Therefore, the smart energy object platform of the whole city serves as the first-level object sub-platform of the smart city object platform, which is integrated with the energy information sensing function and energy control implementing function of the whole city. For this first-level smart energy object sub-platform, it is also composed of the object platforms of the composite IoT systems of different energy types, including smart water object sub-platform, smart electricity object sub-platform, smart gas object sub-platform, and smart heat object sub-platform. These object sub-platforms can serve as the second-level object sub-platforms in the energy field of the smart city to realize the sensing and control functions of the composite IoT system in each corresponding energy field. Similarly, the second-level object sub-platforms of the different energy categories can be further divided into the third-level object sub-platforms of different usage natures. For example, the smart water object sub-platform can be divided into smart public water object sub-platform and smart household water object sub-platform; the smart electricity object sub-platform can be divided into smart public electricity object sub-platform and smart household electricity object sub-platform; the smart gas object sub-platform can be divided into smart public gas object sub-platform and smart household gas object sub-platform; and the smart heat energy object sub-platform can be divided into a smart public heat energy object sub-platform and a smart household heat energy object sub-platform. Finally, these smart energy object sub-platforms of different usage natures can be divided into numerous object platforms of single IoT units formed between single energy terminals and users. For example, the smart household water object sub-platform can be divided into object platforms of numerous single IoT units formed between different water meters and users; the smart household electricity object sub-platform can be divided into object platforms of numerous single IoT units formed between different electric meters and users; the smart household gas object sub-platform can be divided into object platforms of numerous single IoT units formed between different gas meters and users; and the smart household heat energy object sub-platform can be divided into object platforms of numerous single IoT units formed between different heat energy meters and users. The object platforms of all the above single IoT units are the smallest component units of the smart city object platform in the field of smart energy.

The industries or fields in human urban activities are diverse. For the composition and division of object sub-platforms in the composite IoT systems in different industries or fields of smart cities, the descriptions are not repeated herein. However, they should all follow the construction rules of the smart city composite IoT system, that is, the object platform should be divided from large to small, level by level, until reaching the object platform of a single IoT unit at a smallest level.

2. Sensor Network Sub-Platform

Figure 4:
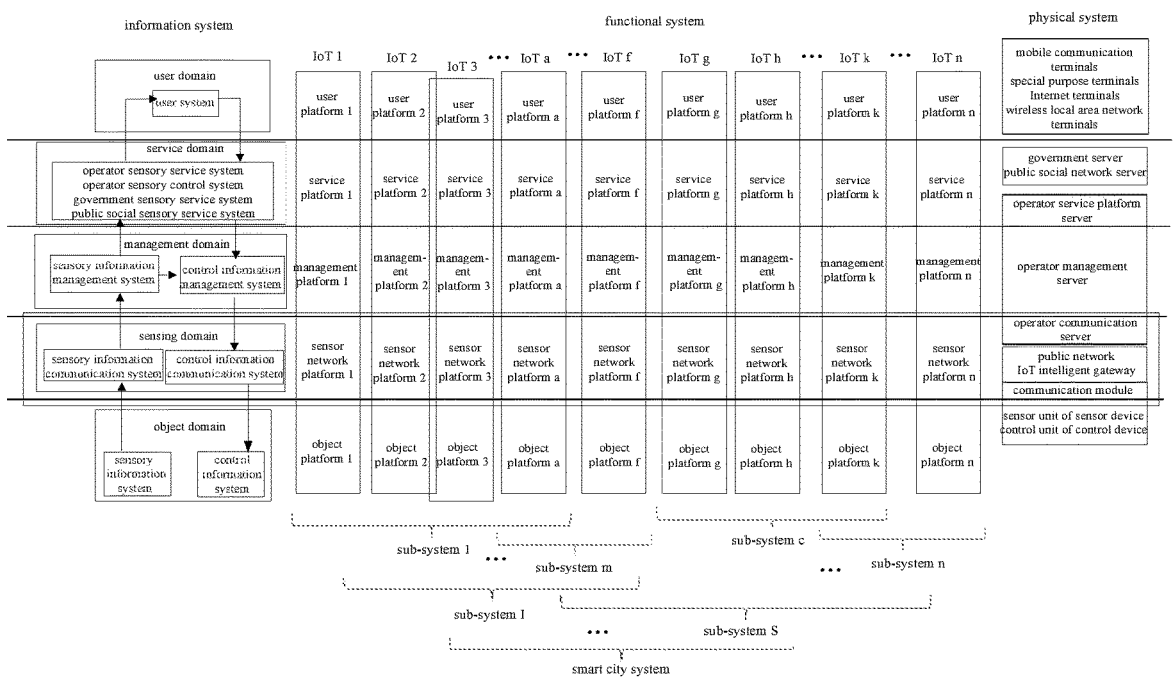
FIG. 4 is a diagram of a smart city sensor network sub-platform.

As shown in FIG. 4, the smart city sensor network platform is a platform for implementing the communication of the sensory information with the control information between the object platform and the management platform in the smart city composite IoT system. The smart city sensor network platform is composed of many different levels of sensor network sub-platforms. These sensor network sub-platforms belong to different industries and different fields. They are in mutual inclusion and juxtaposition relationship, which together show the information transmission function of smart city.

The smart city sensor network platform has multiple levels. According to different industries and fields, the smart city sensor network platform can be first divided into first-level sensor networks sub-platforms of different industries or fields, such as smart traffic sensor network sub-platform, smart medical sensor network sub-platform, smart energy sensor network sub-platform, smart government sensor network sub-platform, smart environmental protection sensor network sub-platform, etc. Sensor network sub-platforms in different industries or fields are platforms for implementing the communication of the sensory information with the control information between the object platform and the management platform of the IoT system in corresponding industry or field. Sensor network sub-platforms will implement the communication of different types of sensory information and control information according to their own industry or field characteristics. In addition to the first-level sensor network sub-platform divided according to industry or field, in the same industry or field, the first-level sensor network sub-platform can be continuously divided according to specific products or corresponding characteristics to form a second-level sensor network sub-platform. The second-level sensor network sub-platform can also be further divided into a third-level sensor network sub-platform, and so on, until reaching the sensor network platform of a single IoT unit at a smallest level.

In the field of smart transportation, the sensor network platforms of the smart traffic composite IoT systems of the whole city serve as the first-level sub-platforms of the smart city sensor network platform. The same as the object platform, the smart city sensor network platform can be gradual divided level by level according to the smart transportations of different districts and counties and smart transportations of different streets. Namely, the first-level smart traffic sensor network sub-platforms of the whole city can be divided into the second-level smart traffic sensor network sub-platforms of different districts and counties; and the second-level smart traffic sensor network sub-platforms of different districts and counties can be further divided into third-level smart traffic sensor network sub-platforms of different streets. Finally, the smart traffic sensor network sub-platforms of different streets can be further divided into sensor network platforms of numerous single IoT units that implement various smart transportation services.

In the field of smart medical care, the sensor network platforms of the smart medical composite IoT systems of the whole city serve as the first-level sub-platforms of the smart city sensor network platform. The same as the object platform, the smart city sensor network platform can be gradual divided level by level according to the smart medical composite IoT systems in different districts and counties, the smart medical composite IoT systems in different hospitals, and the IoT units with different types of smart medical service functions in the same hospital. Namely, the first-level smart medical sensor network sub-platforms of the whole city can be divided into the second-level smart medical sensor network sub-platforms of different districts and counties; and the second-level smart medical sensor network sub-platforms of different districts and counties can be further divided into third-level smart medical sensor network sub-platforms of different hospitals. Finally, the smart medical sensor network sub-platforms of different hospitals can be further divided into sensor network platforms of numerous single IoT units according to various types of smart medical service functions.

In the field of smart energy, the smart energy sensor network platforms of the whole city serve as the first-level sensor network sub-platforms of the smart city sensor network platform, which can also be gradual divided level by level according to different types of energy, different fields of energy usage, and different users. Namely, the first-level energy sensor network sub-platform of the whole city can be divided into the second level of smart water sensor network sub-platform, smart electricity sensor network sub-platform, smart gas sensor network sub-platform, and smart heat energy sensor network sub-platform, according to the four energy types, i.e., water, electricity, gas and heat. These second-level smart energy sensor network sub-platforms can be continuously divided into third-level smart energy sensor network sub-platforms in different usage fields. For example, the smart water sensor network sub-platform can be divided into a smart public water sensor network sub-platform and a smart household water sensor network sub-platform; the smart electricity sensor network sub-platform can be divided into smart public electricity sensor network sub-platform and smart household electricity sensor network sub-platform; the smart gas sensor network sub-platform can be divided into smart public gas sensor network sub-platform and smart household gas sensor network sub-platform; and the smart heat energy sensor network sub-platform can be divided into smart public heat energy sensor network sub-platform and smart household heat energy sensor network sub-platform. Similarly, these third-level smart energy sensor network sub-platforms in different usage fields can be divided into sensor network platforms of numerous single IoT units formed between single energy terminals and users. For example, the smart household water sensor network sub-platform can be divided into sensor network platforms of numerous single IoT units formed between different water meters and users; the smart household electricity sensor network sub-platform can be divided into sensor network platforms of numerous single IoT units formed between different electric meters and users; the smart household gas sensor network sub-platform can be divided into sensor network platforms of numerous single IoT units formed between different gas meters and users; and the smart household heat energy sensor network sub-platform can also be divided into sensor network platforms of numerous single IoT units formed between different heat energy meters and users.

3. Management Sub-Platform

Figure 5:
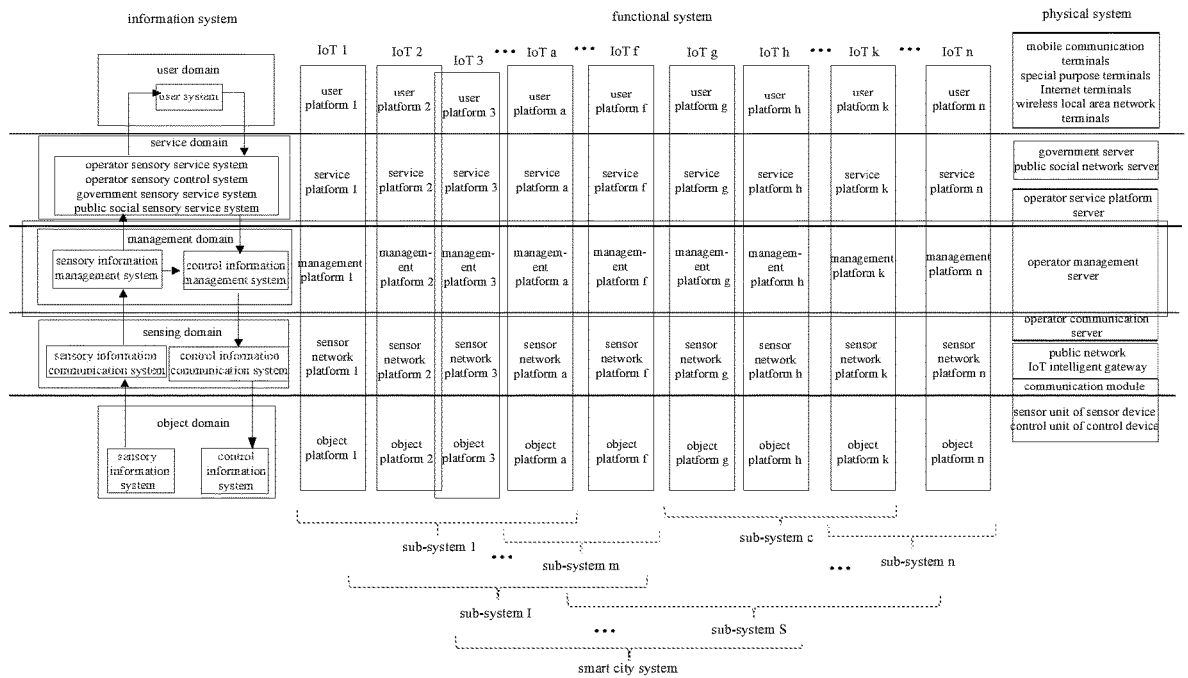
FIG. 5 is a diagram of a smart city management sub-platform.

As shown in FIG. 5, the smart city management platform is a platform for implementing the comprehensive management of urban operation and maintenance in the smart city composite IoT system. The smart city management platform is composed of many different levels of management sub-platforms. Similarly, these management sub-platforms belong to different industries and different fields. They are in mutual inclusion and juxtaposition relationship, which together show the management function of smart city.

The smart city management platform has multiple levels. According to different industries and fields, the smart city management platform can be first divided into first-level management sub-platforms of different industries or fields, such as smart traffic management sub-platform, smart medical management sub-platform, smart energy management sub-platform, smart government management sub-platform, smart environmental protection management sub-platform, etc. The management sub-platforms in different industries or fields implement the smart management of industry or field in the IoT system of the corresponding industry or field. For example, in the field of smart transportation, the smart traffic management sub-platform can collect various traffic management information such as traffic flow, traffic accidents, parking lots, etc. in real time, and realize information integration, and then realize smart management of traffic guidance, diversion and rescue by means of smart control of traffic signals, vehicle guidance, information prompting and other means. In addition to the first-level management sub-platform divided according to industry or field, in the composite IoT system of the same industry or field, the management platform can be further divided into a second-level management sub-platform. The second-level management sub-platform can be further refined to form a third-level management sub-platform, and so on, until reaching the management platform of a single IoT unit at a smallest level.

Similarly, in the field of smart transportation, the management platforms of the smart traffic composite IoT systems of the whole city serve as the first-level sub-platforms of the smart city management platform. Also, the smart city management platform can be gradual divided level by level according to the smart transportation of different districts and counties and smart transportation of different streets. Namely, the first-level smart traffic management sub-platforms of the whole city can be divided into the second-level smart traffic management sub-platforms of different districts and counties; and the second-level smart traffic management sub-platforms of different districts and counties can be further divided into third-level smart traffic management sub-platforms of different streets. Finally, the smart traffic management sub-platforms of different streets can be further divided into management platforms of numerous single IoT units that implement various smart transportation managements.

In the field of smart medical care, the management platforms of the smart medical composite IoT systems of the whole city serve as the first-level sub-platforms of the smart city management platform. Also, the smart city management sub-platform can be gradual divided level by level according to the smart medical composite IoT systems in different districts and counties, the smart medical composite IoT systems in different hospitals, and the IoT units with different types of smart medical service functions in the same hospital. Namely, the first-level smart medical management sub-platforms of the whole city can be divided into the second-level smart medical management sub-platforms of different districts and counties; and the second-level smart medical management sub-platforms of different districts and counties can be further divided into third-level smart medical management sub-platforms of different hospitals. Finally, the smart medical management sub-platforms of different hospitals can be further divided into management platforms of numerous single IoT units according to various types of smart medical service functions.

In the field of smart energy, the smart energy management platforms of the whole city serve as the first-level management sub-platforms of the smart city management platform, which can also be gradual divided level by level according to different types of energy, different fields of energy usage, and different users. Namely, the first-level energy management sub-platform of the whole city can be divided into the second levels of smart water management sub-platform, smart electricity management sub-platform, smart gas management sub-platform, and smart heat energy management sub-platform, according to the four energy types, i.e., water, electricity, gas and heat. These second-level smart energy management sub-platforms can be continuously divided into third-level smart energy management sub-platforms in different usage fields. For example, the smart water management sub-platform can be divided into a smart public water management sub-platform and a smart household water management sub-platform; the smart electricity management sub-platform can be divided into smart public electricity management sub-platform and smart household electricity management sub-platform; the smart gas management sub-platform can be divided into smart public gas management sub-platform and smart household gas management sub-platform; and the smart heat energy management sub-platform can be divided into smart public heat energy management sub-platform and smart household heat energy management sub-platform. Similarly, these third-level smart energy management sub-platforms in different usage fields can be divided into management platforms of numerous single IoT units formed between single energy terminals and users. For example, the smart household water management sub-platform can be divided into management platforms of numerous single IoT units formed between different water meters and users; the smart household electricity management sub-platform can be divided into management platforms of numerous single IoT units formed between different electric meters and users; the smart household gas management sub-platform can be divided into management platforms of numerous single IoT units formed between different gas meters and users; and the smart household heat energy management sub-platform can also be divided into management platforms of numerous single IoT units formed between different heat energy meters and users.

4. Service Sub-Platform

Figure 6:
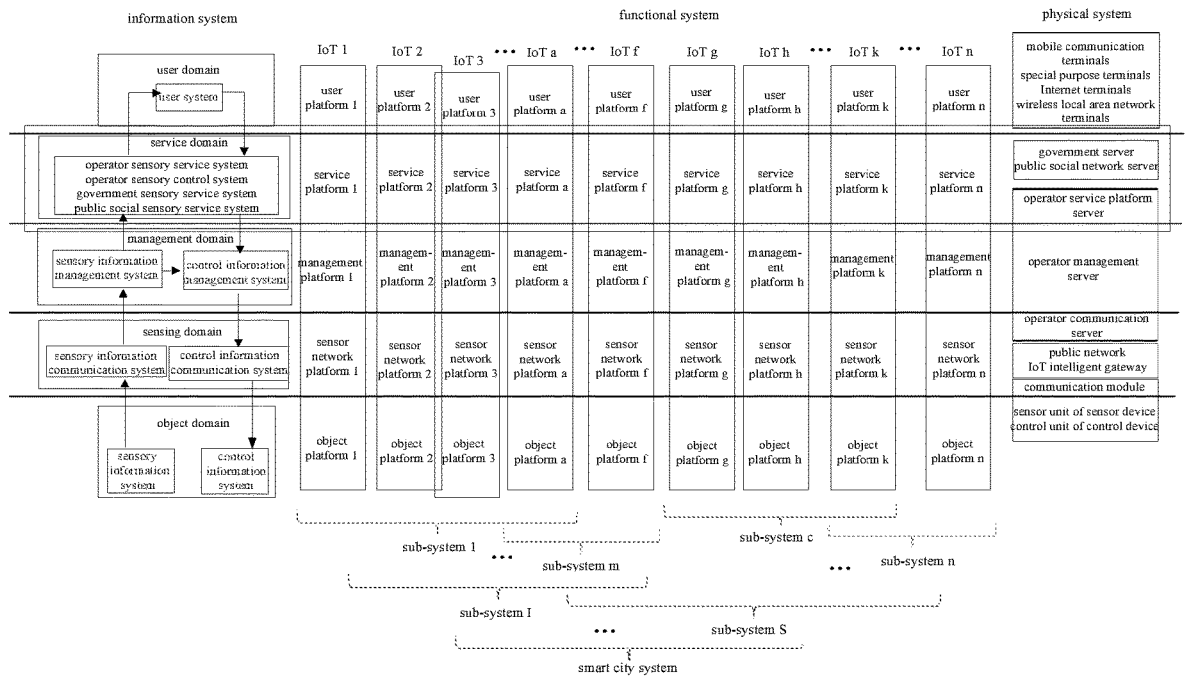
FIG. 6 is a diagram of a smart city service sub-platform.

As shown in FIG. 6, the smart city service platform is a platform for providing services for users and realizing smart city service functions in the smart city composite IoT system. The smart city service platform is composed of many different levels of service sub-platforms. Similarly, these service sub-platforms belong to the composite IoT systems in different industries and different fields. They are in mutual inclusion and juxtaposition relationship, which together show the service function of smart city.

The smart city service platform has multiple levels. Similarly, according to different industries and fields, the smart city service platform can be first divided into first-level service sub-platforms of different industries or fields, such as smart traffic service sub-platform, smart medical service sub-platform, smart energy service sub-platform, smart government service sub-platform, smart environmental protection service sub-platform, etc. The service sub-platforms in different industries or fields implement the smart service functions of the industry or field in the IoT system of the corresponding industry or field. In addition to the first-level service sub-platform divided according to industry or field, in the composite IoT system of the same industry or field, the service platform can be further divided into a second-level service sub-platform. The second-level service sub-platform can be further refined to form a third-level service sub-platform, and so on, until reaching the service platform of a single IoT unit at a smallest level.

In the field of smart transportation, the service platforms of the smart traffic composite IoT systems of the whole city serve as the first-level sub-platforms of the smart city service platform. Also, the smart city service sub-platform can be gradual divided level by level according to the smart transportation of different districts and counties and smart transportation of different streets. Namely, the first-level smart traffic service sub-platforms of the whole city can be divided into the second-level smart traffic service sub-platforms of different districts and counties; and the second-level smart traffic service sub-platforms of different districts and counties can be further divided into third-level smart traffic service sub-platforms of different streets. Finally, the smart traffic service sub-platforms of different streets can be further divided into service platforms of numerous single IoT units that implement various smart transportation services.

In the field of smart medical care, the service platforms of the smart medical composite IoT systems of the whole city serve as the first-level sub-platforms of the smart city service platform. Also, the smart city service sub-platform can be gradual divided level by level according to the smart medical composite IoT systems in different districts and counties, the smart medical composite IoT systems in different hospitals, and the IoT units with different types of smart medical service functions in the same hospital. Namely, the first-level smart medical service sub-platforms of the whole city can be divided into the second-level smart medical service sub-platforms of different districts and counties; and the second-level smart medical service sub-platforms of different districts and counties can be further divided into third-level smart medical service sub-platforms of different hospitals. Finally, the smart medical service sub-platforms of different hospitals can be further divided into service platforms of numerous single IoT units according to various types of smart medical service functions.

In the field of smart energy, the smart energy service platforms of the whole city serve as the first-level service sub-platforms of the smart city service platform, which can also be gradual divided level by level according to different types of energy, different fields of energy usage, and different users. Namely, the first-level energy service sub-platform of the whole city can be divided into the second levels of smart water service sub-platform, smart electricity service sub-platform, smart gas service sub-platform, and smart heat service sub-platform, according to the four energy types, i.e., water, electricity, gas and heat. These second-level smart energy service sub-platforms can be continuously divided into third-level smart energy service sub-platforms in different usage fields. For example, the smart water service sub-platform can be divided into a smart public water service sub-platform and a smart household water service sub-platform; the smart electricity service sub-platform can be divided into smart public electricity service sub-platform and smart household electricity service sub-platform; the smart gas service sub-platform can be divided into smart public gas service sub-platform and smart household gas service sub-platform; and the smart heat energy service sub-platform can be divided into smart public heat energy service sub-platform and smart household heat energy service sub-platform. Similarly, these third-level smart energy service sub-platforms in different usage fields can be divided into service platforms of numerous single IoT units formed between single energy terminals and users. For example, the smart household water service sub-platform can be divided into service platforms of numerous single IoT units formed between different water meters and users; the smart household electricity service sub-platform can be divided into service platforms of numerous single IoT units formed between different electric meters and users; the smart household gas service sub-platform can be divided into service platforms of numerous single IoT units formed between different gas meters and users; and the smart household heat service sub-platform can also be divided into service platforms of numerous single IoT units formed between different heat energy meters and users.

5. User Sub-Platform

Figure 7:
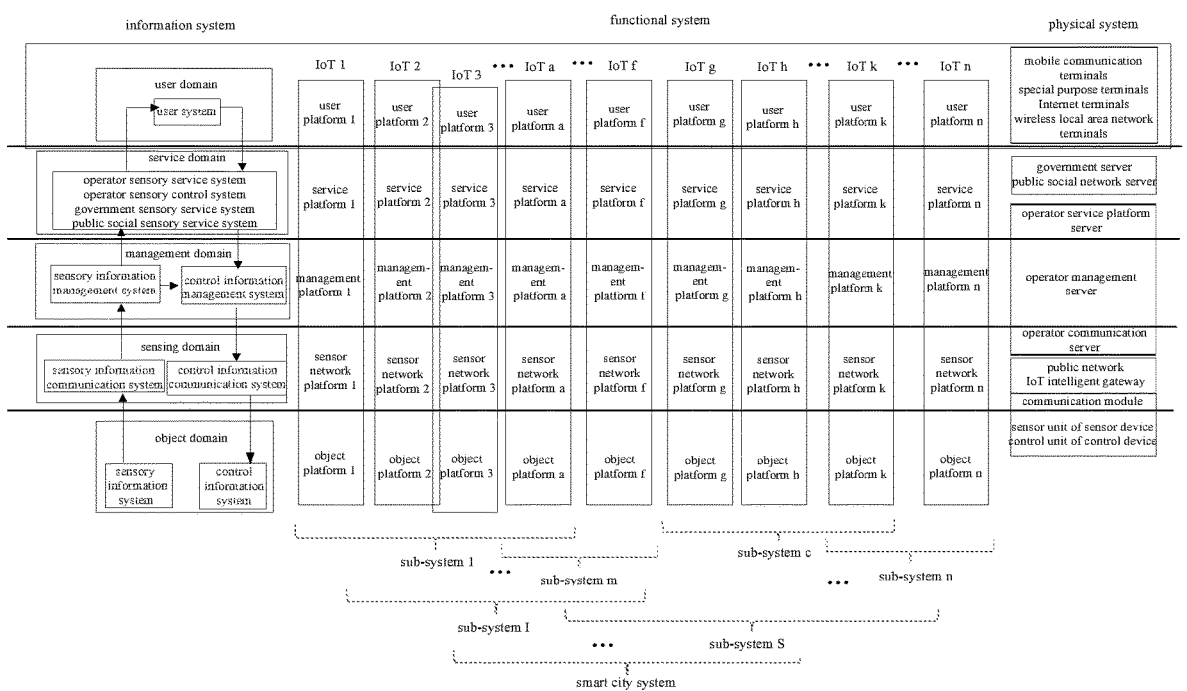
FIG. 7 is a diagram of a smart city user sub-platform.

As shown in FIG. 7, the smart city user platform is a platform for users to enjoy services in the smart city composite IoT system. The smart city user platform is composed of many different levels of user sub-platforms. Similarly, these user sub-platforms belong to the composite IoT system in different industries and different fields. They are in mutual inclusion and juxtaposition relationship, which together show that people enjoy the service function in the smart city.

The smart city user platform has multiple levels. Similarly, according to different industries and fields, the smart city user platform can be first divided into first-level user sub-platforms of different industries or fields, such as smart traffic user sub-platform, smart medical user sub-platform, smart energy user sub-platform, smart government user sub-platform, smart environmental protection user sub-platform, etc. Through the user sub-platforms of different industries or fields, users can enjoy the smart service functions of IoT system in the corresponding industry or field. In addition to the first-level user sub-platform divided according to industry or field, in the composite IoT system of the same industry or field, the user platform can be further divided into a second-level user sub-platform. The second-level user sub-platform can be further refined to form a third-level user sub-platform, and so on, until reaching the user platform of a single IoT unit at a smallest level.

In the field of smart transportation, the user platforms of the smart traffic composite IoT systems of the whole city serve as the first-level sub-platforms of the smart city user platform. Also, the smart city user sub-platform can be gradual divided level by level according to the smart transportation of different districts and counties and smart transportation of different streets. Namely, the first-level smart traffic user sub-platforms of the whole city can be divided into the second-level smart traffic user sub-platforms of different districts and counties; and the second-level smart traffic user sub-platforms of different districts and counties can be further divided into third-level smart traffic user sub-platforms of different streets. Finally, the smart traffic user sub-platforms of different streets can be further divided into user platforms of numerous single IoT units that implement various smart transportation services.

In the field of smart medical care, the user platforms of the smart medical composite IoT systems of the whole city serve as the first-level sub-platforms of the smart city user platform. Also, the smart city user sub-platform can be gradual divided level by level according to the smart medical composite IoT systems in different districts and counties, the smart medical composite IoT systems in different hospitals, and the IoT units with different types of smart medical service functions in the same hospital. Namely, the first-level smart medical user sub-platforms of the whole city can be divided into the second-level smart medical user sub-platforms of different districts and counties; and the second-level smart medical user sub-platforms of different districts and counties can be further divided into third-level smart medical user sub-platforms of different hospitals. Finally, the smart medical user sub-platforms of different hospitals can be further divided into user platforms of numerous single IoT units according to various types of smart medical service functions.

In the field of smart energy, the smart energy user platforms of the whole city serve as the first-level user sub-platforms of the smart city user platform, which can also be gradual divided level by level according to different types of energy, different fields of energy usage, and different users. Namely, the first-level energy user sub-platform of the whole city can be divided into the second level of smart water user sub-platform, smart electricity user sub-platform, smart gas user sub-platform, and smart heat energy user sub-platform, according to the four energy types, i.e., water, electricity, gas and heat. These second-level smart energy user sub-platforms can be continuously divided into third-level smart energy user sub-platforms in different usage fields. For example, the smart water user sub-platform can be divided into a smart public water user sub-platform and a smart household water user sub-platform; the smart electricity user sub-platform can be divided into smart public electricity user sub-platform and smart household electricity user sub-platform; the smart gas user sub-platform can be divided into smart public gas user sub-platform and smart household gas user sub-platform; and the smart heat energy user sub-platform can be divided into smart public heat energy user sub-platform and smart household heat energy user sub-platform. Similarly, these third-level smart energy user sub-platforms in different usage fields can be divided into user platforms of numerous single IoT units formed between single energy terminals and users. For example, the smart household water user sub-platform can be divided into user platforms of numerous single IoT units formed between different water meters and users; the smart household electricity user sub-platform can be divided into user platforms of numerous single IoT units formed between different electric meters and users; the smart household gas user sub-platform can be divided into user platforms of numerous single IoT units formed between different gas meters and users; and the smart household heat energy user sub-platform can also be divided into user platforms of numerous single IoT units formed between different heat energy meters and users.

In addition to the foregoing descriptions, it should be noted that "one embodiment", "another embodiment", "an embodiment", etc., mentioned in the specification indicate that the specific features, structures or characteristics described in combination with the embodiment are included in at least one embodiment of the general description of the present application. The same expression in several parts of the specification does not necessarily refer to the same embodiment. Further, when specific features, structures, or characteristics are described in combination with any embodiment, it is asserted that the realizations of such features, structures, or characteristics in combination with other embodiments also fall within the scope of the present invention.

Although the present invention has been described herein with reference to the explanatory embodiments of the present invention, it should be understood that various modifications and other embodiments can be devised by those skilled in the art, and those modifications and embodiments will fall within the disclosed principle scope and spirit of the present application. More specifically, various variations and modifications can be made to the component parts and/or arrangement of the subject combination arrangement within the scope of the disclosure, the drawings and the claims of the present application. In addition to the variations and modifications to the component parts and/or arrangements, other uses of the present invention will also be apparent to those skilled in the art.

What is claimed is:

1. A smart city system architecture, wherein
the smart city system architecture comprises at least one smart city sub-system;
the at least one smart city sub-system comprises a functional system, a physical system, and an information system;
the functional system is a form of a function expression; the information system is a way of function implementation; and the physical system is a carrier providing a physical support for the function implementation;
the functional system has a five-platform structure, comprising an object platform, a sensor network platform, a management platform, a service platform, and a user platform; the physical system has a five-layer structure, comprising an object layer, a sensor network layer, a management layer, a service layer, and a user layer; and the information system has a five-domain structure, comprising an object domain, a sensing domain, a management domain, a service domain, and a user domain;
a function of each platform in the functional system is implemented through supports of physical entities in the physical system and an operation of information in the information system; and
the object platform of the functional system corresponds to the object layer in the physical system and the object domain in the information system; the sensor network platform of the functional system corresponds to the sensor network layer in the physical system and the sensing domain in the information system; the management platform of the functional system corresponds to the management layer in the physical system and the management domain in the information system; the service platform of the functional system corresponds to the service layer in the physical system and the service domain in the information system; and the user platform of the functional system corresponds to the user layer in the physical system and the user domain in the information system.

2. The smart city system architecture according to claim 1, wherein
a function of the object platform is to implement sensing and control; a sensor unit of a sensor device senses sensory information and realizes a sensing function; through the sensor network platform, the management platform and the service platform, the sensory information is transmitted to a user through an operation of the smart city system architecture; after the sensory information is converted into control information by the user, the control information is transmitted via the service platform, the management platform, and the sensor network platform to a control device of the object platform; and the control is performed by the control unit of the control device, thereby forming a closed-loop information structure.

3. The smart city system architecture according to claim 2, wherein
the sensor device and the control device form a single device performing the sensing and the control together.

4. The smart city system architecture according to claim 1, wherein
a function of the sensor network platform of a smart city is to implement a mutual communication between the object platform and the management platform; wherein a communication module of a sensor device sends the sensory information obtained by the sensor device to an IoT intelligent gateway, and the IoT intelligent gateway transmits the sensory information to an operator communication server through a public network, thereby completing a communication of the sensory information in the sensor network platform; the operator communication server sends the control information to the IoT intelligent gateway through the public network, and the IoT intelligent gateway sends the control information to the communication module of the control device, thereby completing a communication of the control information in the sensor network platform.

5. The smart city system architecture according to claim 1, wherein
the management platform processes, stores, classifies, identifies and analyzes the information in the smart city system architecture, thereby implementing management functions, and providing supports for the service system; the management platform is an integrated management platform of the smart city system architecture; and
the management domain comprises a sensory information management system and a control information management system; the management platform corresponds to an operator management server in the physical system and a plurality of facilities connected to the server; and the management platform is a carrier of the sensory information management system and the control information management system in the information system.

6. The smart city system architecture according to claim 1, wherein the service platform is a platform to provide services for users and implement service functions, including an operator service platform, a public government service platform, and a public social network service platform; the service items of the service platform comprise public services and operator services; and
the service platform corresponds to three parts in the physical system, and the three parts comprise an operator service platform server, a government server, and a public social network server.

7. The smart city system architecture according to claim 1, wherein
a function of the user platform is for users to enjoy the services of the smart city system architecture; the users use user terminals to realize needed outputs and enjoy the services of the smart city system architecture through human-computer interaction.

8. The smart city system architecture according to claim 1, wherein
through mutual connections between various physical layers of the physical system, a complete physical system architecture of a smart city is formed, thereby supporting a complete operation of the information of the smart city, and finally realizing the functions of the smart city; wherein,
the object layer is a layer where carrying entities carrying all object information in the smart city are located; and the object layer comprises a sensor unit of a sensor device and a control unit of a control device, possessing a sensing function and a control function;
the sensor network layer comprises a communication module of a sensor device and a communication module of a control device, an IoT intelligent gateway, a public network, and an operator communication server; and through a sensor network composed of the communication module of the sensor device, the communication module of the control device, the IoT intelligent gateway, the public network and the operator communication server, the sensor network layer realizes a mutual communication with an operator management server;
a core of the management layer is servers, comprising an operator management server;
the service layer comprises an operator service platform server, a government server, and a public social network server; and
the user layer is a facility providing a physical support for functions of the user platform, comprising a plurality of terminal units including mobile communication terminals, special purpose terminals, Internet terminals, and/or wireless local area network terminals.

9. The smart city system architecture according to claim 1, wherein
a function of the information system is to implement the operation of the information in the smart city system architecture;
the information in the object domain comprises sensory information and control information; the sensory information is derived from an information source, and the control information is issued after passing through the smart city system architecture;
the sensing domain is a collection of communication information in a smart city, comprising sensory communication information and control communication information; wherein the sensory communication information is information for communicating sensory information uploaded by the object domain, and the sensory communication information is provided by a sensory information communication system; and the control communication information is information for communicating control information issued after passing through the smart city system architecture, and the control communication information is provided by a control information communication system;

the management domain is a collection of management information in a smart city, comprising sensory management information and control management information; wherein the sensory management information is provided by a sensory information management system; the control management information is provided by a control information management system; and the management domain is an information guarantee for an orderly operation of the smart city;

the service domain is a collection of service information in a smart city, comprising sensory service information and control service information; wherein the sensory service information is provided by an operator sensory service system, a government sensory service system, and a public social sensory service system; and the control service information is provided by an operator control service system; and the user domain is a collection of user information, comprising relevant user information.

10. The smart city system architecture according to claim 1, wherein the smart city sub-system is divided into different levels of smart city sub-systems; a previous level smart city sub-system comprises at least one next level smart city sub-system and/or at least one IoT system; and a lowest level smart city sub-system comprises at least one IoT system.

11. The smart city system architecture according to claim 10, wherein a form of juxtaposition, intersection or inclusion exists among the smart city sub-systems; at a same level, the smart city sub-systems are in a juxtaposition or an intersection relationship; at different levels, the smart city sub-systems are in a juxtaposition, an intersection or an inclusion relationship; and the intersection or the inclusion relationship is reflected in an information sharing among the smart city sub-systems.

12. The smart city system architecture according to claim 10, wherein the at least one IoT system comprises the functional system, the physical system, and the information system; and wherein the functional system is an expression form of functions of the smart city sub-systems or the IoT system; the information system is an implementation way of the functions of the smart city sub-systems or the IoT system; and the physical system is a physical support carrier for an implementation of the functions of the smart city sub-systems or the IoT system.

13. The smart city system architecture according to claim 1, wherein the smart city system architecture possesses openness; the object platform, sensor network platform, management platform, service platform and user platform in the functional system of a smart city comprise a plurality of object sub-platforms, a plurality of sensor network sub-platforms, a plurality of management sub-platforms, a plurality of service sub-platforms and a plurality of user sub-platforms, respectively.

14. The smart city system architecture according to claim 13, wherein each sub-platform in the functional system of the smart city is divided into different levels of sub-platforms; a previous level sub-platform comprises at least one next level sub-platform and/or at least one functional platform of the IoT system; and a lowest level sub-platform comprises at least one functional platform of the IoT system.

15. The smart city system architecture according to claim 14, wherein a form of juxtaposition, intersection or inclusion exists among the sub-platforms in the functional system of the smart city; at a same level, the sub-systems are in a juxtaposition relationship; at different levels, the sub-systems are in a juxtaposition, an intersection or an inclusion relationship; and the intersection or the inclusion relationship is finally reflected in an information sharing among the sub-systems.

16. The smart city system architecture according to claim 14, wherein the plurality of object sub-platforms jointly form the object platform of the smart city, and jointly exhibit comprehensive sensing and control functions of the smart city; the object sub-platforms are divided into different levels of object sub-platforms; a previous level object sub-platform comprises at least one next level object sub-platform and/or at least one object platform of single IoT system; and a lowest level object sub-platform comprises at least one object platform of single IoT system.

17. The smart city system architecture according to claim 14, wherein the plurality of sensor network sub-platforms jointly form the sensor network platform of the smart city to realize a communication of sensory information with control information between the object platform and the management platform in the smart city system architecture; the sensor network sub-platforms are divided into different levels of sensor network sub-platforms; a previous level sensor network sub-platform comprises at least one next level sensor network sub-platform and/or at least one sensor network platform of single IoT system; and a lowest level sensor network sub-platform comprises at least one sensor network platform of single IoT system.

18. The smart city system architecture according to claim 14, wherein the plurality of management sub-platforms jointly form the management platform of the smart city to realize an integrated urban management in the smart city system architecture; the management sub-platforms are divided into different levels of management sub-platforms; a previous level management sub-platform comprises at least one next level management sub-platform and/or at least one management platform of single IoT system; and a lowest level management sub-platform comprises at least one management platform of single IoT system.

19. The smart city system architecture according to claim 14, wherein the plurality of service sub-platforms jointly form the service platform of the smart city to realize service functions of a smart city; the service sub-platforms are divided into different levels of service sub-platforms; a previous level service sub-platform comprises at least one next level service sub-platform and/or at least one service platform of single IoT system; and a lowest level service sub-platform comprises at least one service platform of single IoT system.

20. The smart city system architecture according to claim 14, wherein
the plurality of user sub-platforms jointly form the user platform of the smart city to realize a function of a smart city to provide services for users; the user sub-platforms are divided into different levels of user sub-platforms; a previous level user sub-platform comprises at least one next level user sub-platform and/or at least one user platform of single IoT system; and a lowest level user sub-platform comprises at least one user platform of single IoT system.

* * * * *